(12) United States Patent
Choi et al.

(10) Patent No.: US 12,505,882 B2
(45) Date of Patent: Dec. 23, 2025

(54) APPARATUS AND METHOD FOR PROGRAMMING AND VERIFYING DATA IN A NONVOLATILE MEMORY DEVICE

(71) Applicant: SK hynix Inc., Icheon-si (KR)

(72) Inventors: Hyung Jin Choi, Icheon-si (KR); Gwi Han Ko, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 308 days.

(21) Appl. No.: 18/295,726

(22) Filed: Apr. 4, 2023

(65) Prior Publication Data

US 2024/0177773 A1    May 30, 2024

(30) Foreign Application Priority Data

Nov. 28, 2022  (KR) .......... 10-2022-0161556

(51) Int. Cl.
    *G11C 16/10*    (2006.01)
    *G11C 16/34*    (2006.01)
(52) U.S. Cl.
    CPC .......... *G11C 16/10* (2013.01); *G11C 16/3459* (2013.01)
(58) Field of Classification Search
    CPC .................................................. G11C 16/10
    USPC .................................................. 365/185.18
    See application file for complete search history.

(56) References Cited

U.S. PATENT DOCUMENTS

| | | | |
|---|---|---|---|
| 11,057,226 B1* | 7/2021 | Jeon | H04L 25/0264 |
| 2009/0285021 A1* | 11/2009 | Lim | G11C 16/3454 |
| | | | 365/185.12 |
| 2020/0051649 A1* | 2/2020 | Her | G11C 16/30 |
| 2022/0101933 A1* | 3/2022 | Choi | G11C 11/5628 |

FOREIGN PATENT DOCUMENTS

| | | |
|---|---|---|
| KR | 101633018 B1 | 6/2016 |
| KR | 1020220033651 A | 3/2022 |

* cited by examiner

*Primary Examiner* — Muna A Techane
(74) *Attorney, Agent, or Firm* — WILLIAM PARK AND ASSOCIATES LTD.

(57) ABSTRACT

A memory device comprising: a memory cell array comprising multiple memory cells, and a controller configured to repeatedly perform a program loop comprising a voltage application interval and a verification interval until a program operation for cells that have been connected to a word line that have been selected as a program target reach a threshold voltage level and configured to adjust an increase in a level of a program voltage that is applied to the selected word line in the voltage application interval of a second program loop following a first program loop, based on a result of a comparison between a threshold voltage level of each of cells that have been selected as a verification target, among the cells that have been connected to the selected word line, and a pre-target level in the verification interval of the first program loop, among the program loops that are repeated.

14 Claims, 10 Drawing Sheets

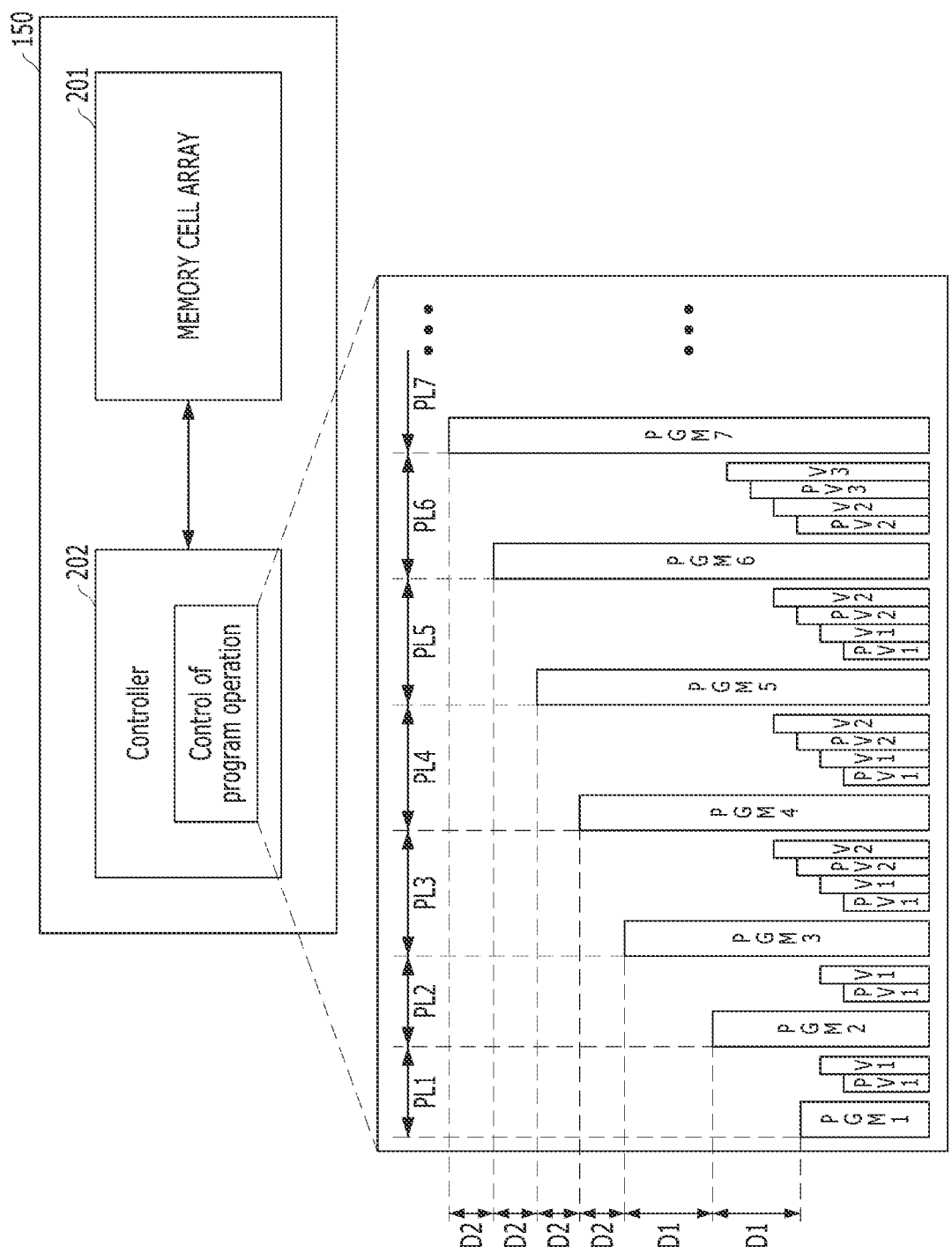

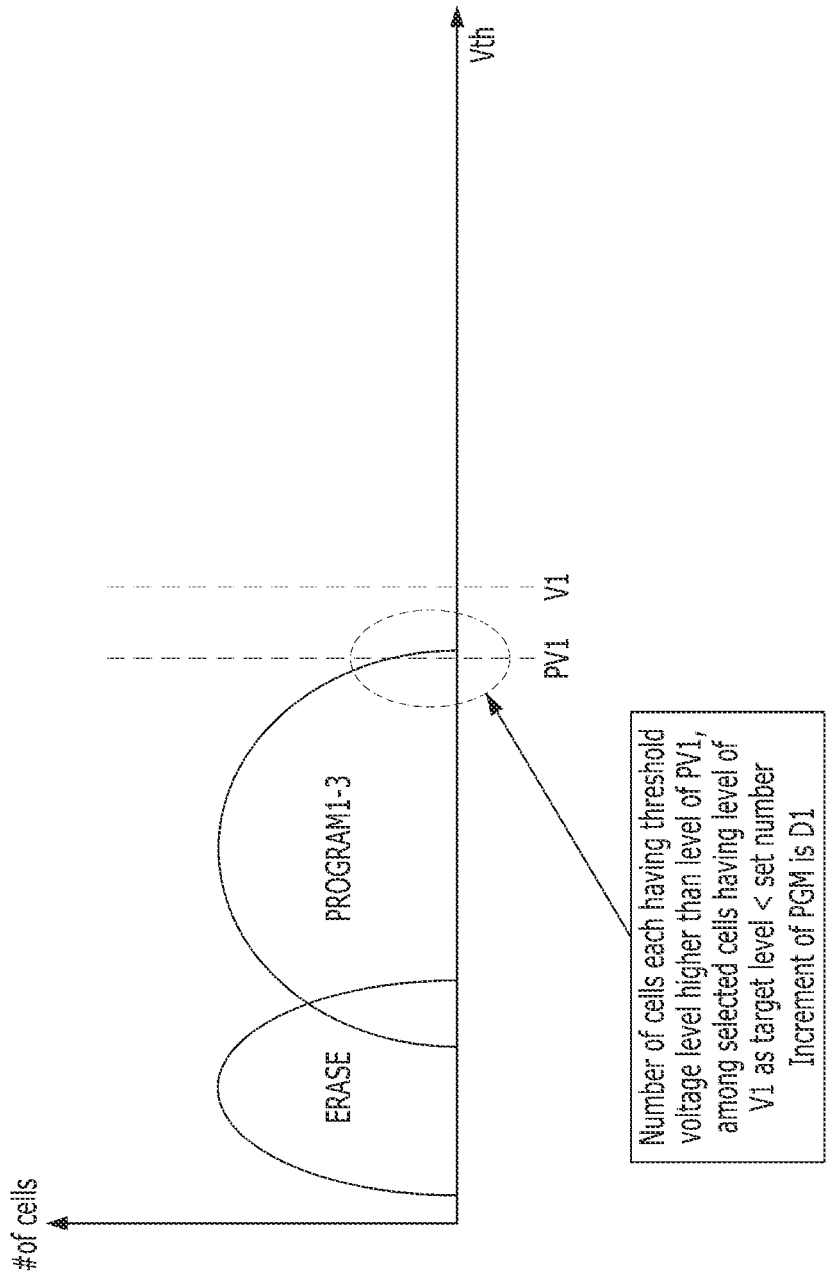

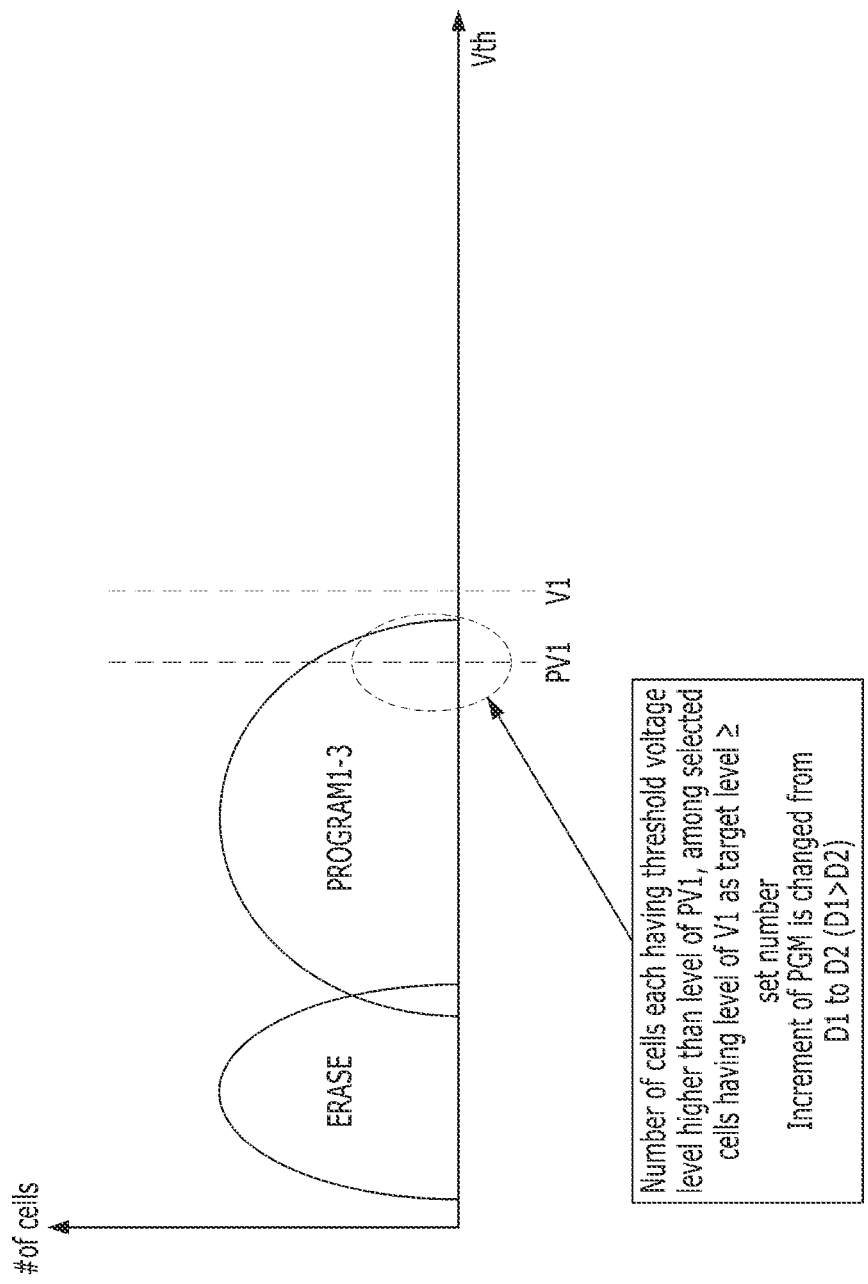

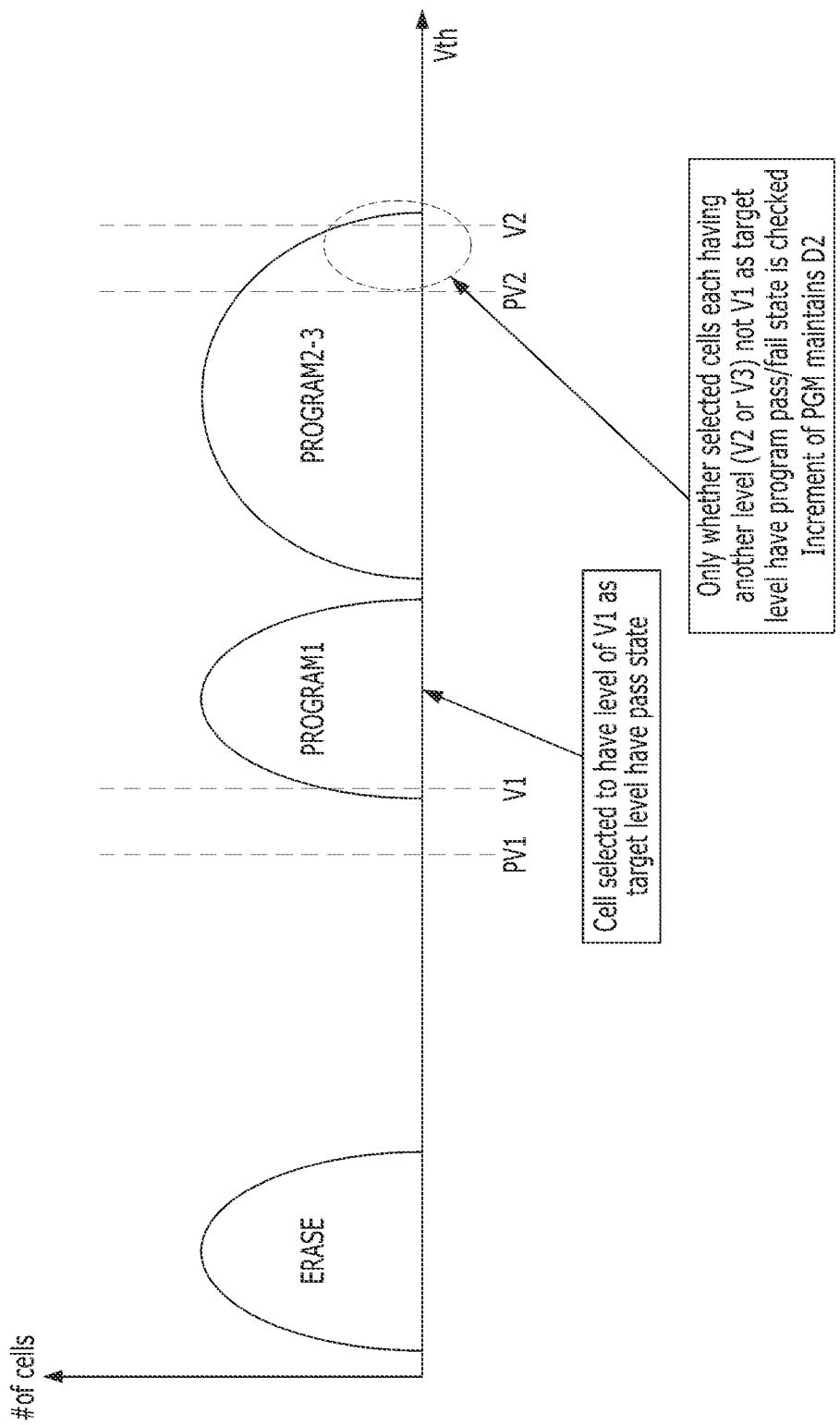

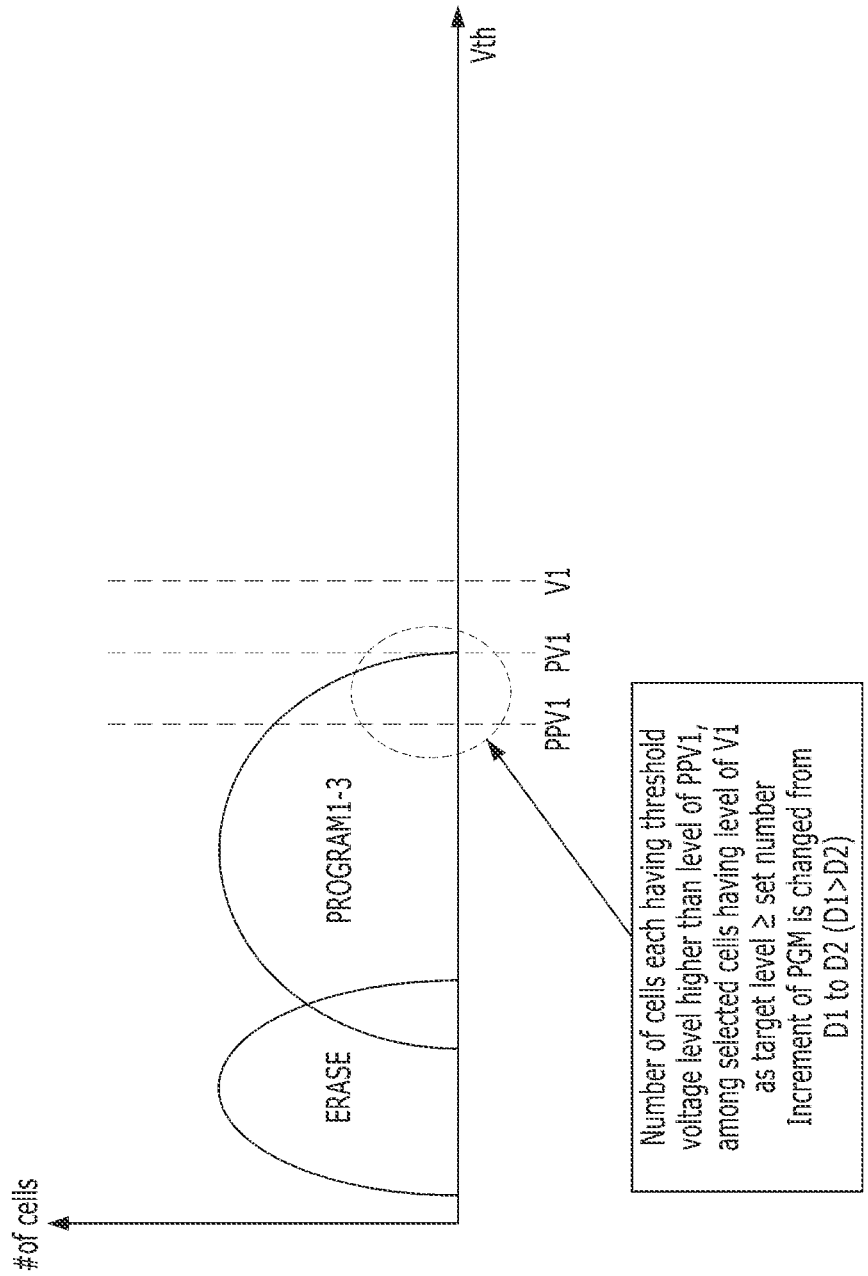

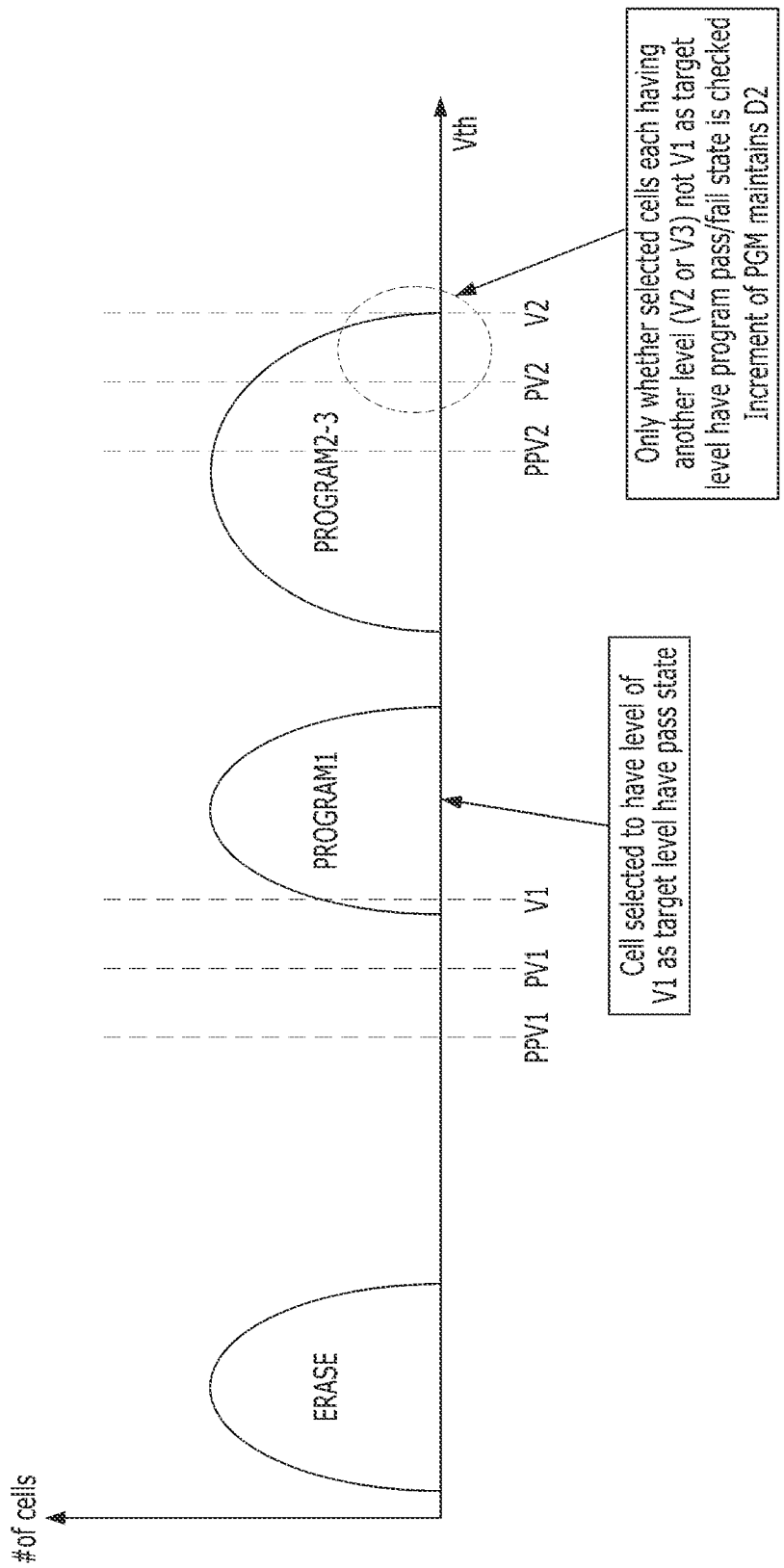

APPARATUS AND METHOD FOR PROGRAMMING AND VERIFYING DATA IN A NONVOLATILE MEMORY DEVICE

CROSS-REFERENCE TO RELATED APPLICATION

This application claims priority under 35 U.S.C. § 119(a) to Korean Patent Application No. 10-2022-0161556 filed on Nov. 28, 2022, which is incorporated herein by reference in its entirety.

BACKGROUND

1. Technical Field

Various embodiments generally relate to a memory device, and more particularly, to an apparatus and method for programming and verifying data in a nonvolatile memory device.

2. Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

A cell of a nonvolatile memory device is an element on which an electrical program/erase operation may be performed. The nonvolatile memory device may perform program and erase operations on the cell by changing the threshold voltage of the cell as electrons are moved by a strong electric field that is applied to a thin oxide film of the cell.

A program operation for the multiple memory cells that are included in a nonvolatile memory device may be performed by an incremental step pulse program (ISPP) algorithm for changing the threshold voltages of memory cells that have been selected as a program target, while applying a program pulse, having a voltage that is increased step by step, to a word line to which the memory cells selected as the program target have been connected. Furthermore, after the program pulse is applied, a verification operation of checking whether threshold voltage levels of the memory cells selected as the program target have reached a target voltage level may be performed.

SUMMARY

An aspect of an embodiment in the disclosure, a memory device may include: a memory cell array comprising multiple memory cells that are connected between multiple word lines and multiple bit lines; and a controller configured to use an increment step pulse program (ISPP) method of repeatedly performing a program loop comprising a voltage application interval and a verification interval until a program operation for cells that have been connected to a word line that have been selected as a program target reach a threshold voltage level, and configured to adjust an increase in a level of a program voltage that is applied to the selected word line in the voltage application interval of a second program loop following a first program loop, based on a result of a comparison between a threshold voltage level of each of cells that have been selected as a verification target, among the cells that have been connected to the selected word line, and a pre-target level lower than a target level in the verification interval of the first program loop, among the program loops that are repeated according to the ISPP method.

An aspect of an embodiment in the disclosure, an operating method of a memory device, may include: repeatedly performing program loops, comprising a voltage application interval and a verification interval, on cells that have been connected to a word line that have been selected as a program target, among multiple memory cells that have been connected between multiple word lines and multiple bit lines according to an increment step pulse program (ISPP) method until a program operation is completed; applying a first program voltage to the selected word line in the voltage application interval of a first program loop, among the program loops that are repeated according to the ISPP method; comparing a threshold voltage level of each of cells that have been selected as a verification target, among the cells that have been connected to the selected word line, and a pre-target level lower than a target level in the verification interval of the first program loop after the first application step; and adjusting an increase in a level of a second program voltage that is applied to the selected word line, based on a result of the comparison step, in the voltage application interval of a second program loop, among the program loops that are repeated according to the ISPP method.

BRIEF DESCRIPTION OF THE DRAWINGS

FIG. 1 is a diagram for describing an example of a method of controlling a program operation in a memory device according to an embodiment of the present disclosure. FIGS. 2A, 2B, and 2C are diagrams for describing processes of distributions of cells being changed by control of the program operation of the memory device according to an embodiment of the present disclosure, which has been described with reference to FIG. 1.

FIGS. 4A, 4B, and 4C are diagrams for describing processes of distributions of cells being changed by control of the program operation of the memory device according to an embodiment of the present disclosure, which has been described with reference to FIG. 3.

DETAILED DESCRIPTION

Figure 3:
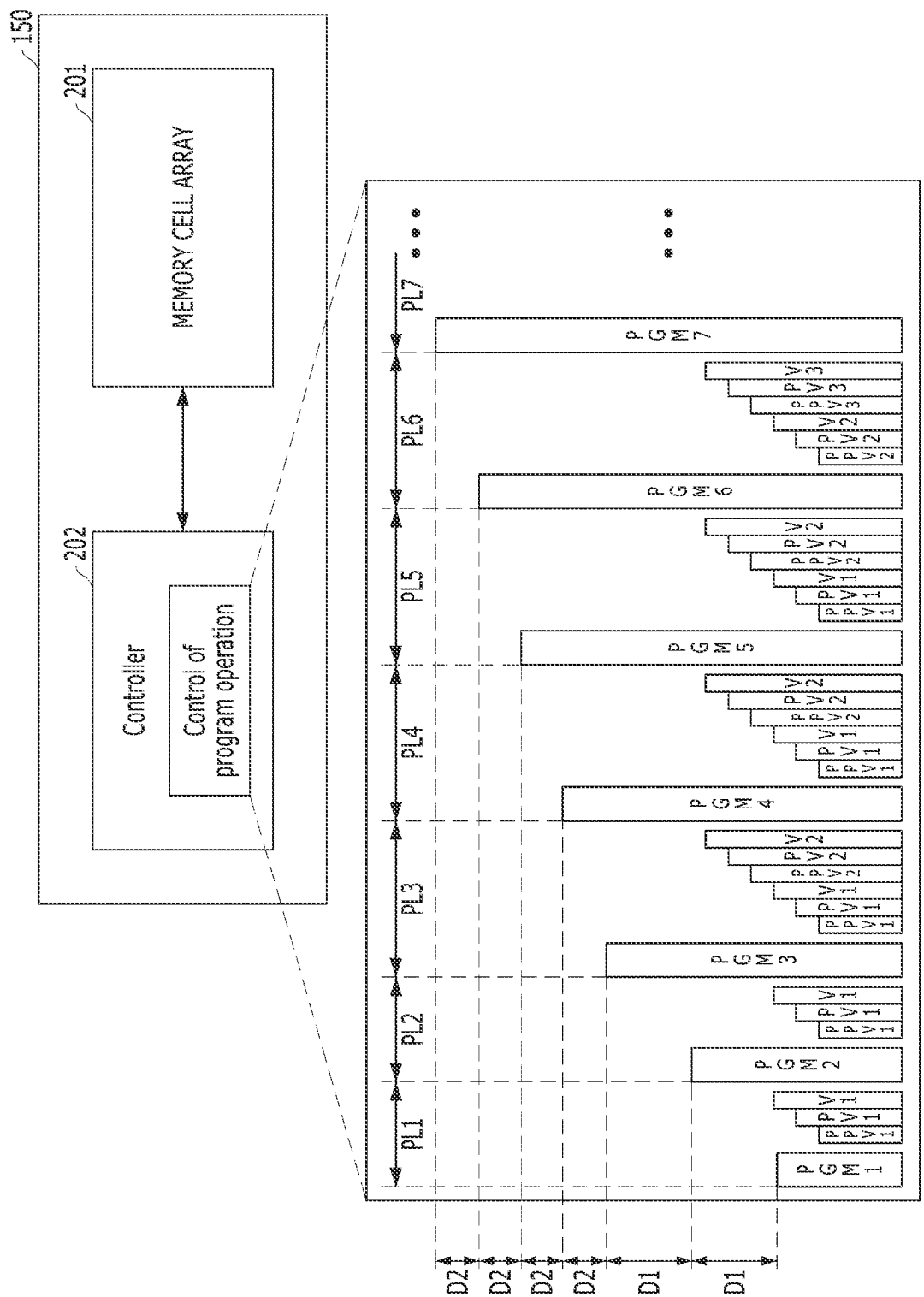
FIG. 3 is a diagram for describing another example of a method of controlling a program operation in the memory device according to an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or might not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Various embodiments are directed to a memory device capable of adjusting an increase in the level of a program voltage to be subsequently performed based on a result of a program verification operation and an operating method thereof.

The problems to be solved by the present disclosure are not limited to the above-mentioned problems, and the other unmentioned problems will be clearly understood from the following description by those skilled in the art.

This technology, in an embodiment, can adjust an increase in the level of a program voltage in a program loop to be subsequently performed based on a result of a program verification operation that has been included in a program loop that has been previously performed, among multiple program loops included in a program operation using an increment step pulse program (ISPP) method.

Accordingly, in an embodiment, improved performance of a program operation can be expected.

FIG. 1 is a diagram for describing an example of a method of controlling a program operation in a memory device according to an embodiment of the present disclosure.

Referring to FIG. 1, a memory device 150 according to an embodiment of the present disclosure may include a memory cell array 201 and a controller 202.

In this case, the memory device 150 may include multiple memory cells (not illustrated) that are connected between multiple word lines (not illustrated) and multiple bit lines (not illustrated). The program state of each of the multiple memory cells that have been included in the memory device 150 may be divided on the basis of N threshold voltage levels. N may be a natural number equal to or greater than 1.

In an embodiment, the memory cells included in the memory cell array 201 may be configured as single level cells (SLCs) each storing 1-bit data, multi-level cells (MLCs) each storing 2-bit data, triple level cells (TLCs) each storing 3-bit data or quad level cells (QLCs) each storing 4-bit data.

In an embodiment, the program state of a single level cell (SLC) in which one data bit is stored may be divided into two program states on the basis of one threshold voltage level. The program state of a multi-level cell (MLC) in which two data bits are stored may be divided into four program states on the basis of three threshold voltage levels. The program state of a triple level cell (TLC) in which three data bits are stored may be divided into eight program states on the basis of seven threshold voltage levels. The program state of a quad level cell (QLC) in which four data bits are stored may be divided into sixteen program states on the basis of fifteen threshold voltage levels. Hereinafter, each of the multiple memory cells that are included in the memory cell array 201 is a multi-level cell, for convenience of description. Accordingly, N is assumed to be 3.

Furthermore, the controller 202 may perform a program operation on a selected region of the memory cell array 201. The program operation may include multiple program loops PL1 to PL7. That is, the controller 202 may program a memory cell that has been selected as a program target so that the memory cell has any one of multiple program states by repeatedly performing the multiple program loops PL1 to PL7 one by one in a set order until the program operation is completed.

Each of the multiple program loops PL1 to PL7 may include a voltage application interval in which threshold voltage levels of memory cells connected to a word line that has been selected as a program target (hereinafter referred to as a "program word line"), among the multiple word lines, are changed by applying program voltages PGM1 to PGM7 to the program word line, and a verification interval in which memory cells that have been selected as a verification target (hereinafter referred to as "verification cells"), among memory cells that have been connected to the program word line (hereinafter referred to as "program cells"), are verified to have which one of four program states by applying, to the program word line, three verification voltages V1, V2, and V3 each corresponding to a target level and three pre-verification voltages PV1, PV2, and PV3 each having a pre-target level lower than the target level.

More specifically, the controller 202 may apply the program voltages PGM1 to PGM7 to the program word line in the voltage application intervals. Accordingly, each of the program cells may be programmed to have any one of multiple program states. Furthermore, in the voltage application intervals, the controller 202 may apply a high program permission voltage to a bit line that has been connected to memory cells each having a threshold voltage level lower than the pre-target level, may apply a low program permission voltage to a bit line that has been connected to memory cells each having a threshold voltage level that is higher than the pre-target level and lower than a target level, and may apply a program inhibition voltage to a bit line that has been connected to memory cells each having a threshold voltage level higher than the target level. In an embodiment, the high program permission voltage may be a ground voltage, the low program permission voltage may be 0.5 V, and the program inhibition voltage may be a source voltage.

Furthermore, before starting the voltage application interval in each of the multiple program loops PL1 to PL7, the controller 202 may perform a bit line precharge operation of precharging each of the multiple bit lines BL1 to BLm that have been connected to the multiple memory cells to a set potential level, for example, a high program permission potential level, a low program permission potential level, or a program inhibition potential level.

The potential level of the program voltage may be increased whenever each of the multiple program loops PL1 to PL7 is performed. That is, in the program operation, the level of the program voltage may be increased according to an increment step pulse program (ISPP) method as each of the multiple program loops PL1 to PL7 is repeatedly performed. The number of program voltages applied, a voltage level, and a voltage application time, which are used in each of the multiple program loops PL1 to PL7, may be determined in various forms.

In particular, the controller 202 according to an embodiment of the present disclosure may adjust an increase in the level of a program voltage that is applied to a program word line in the voltage application interval of a second program loop that is performed subsequently to a first program loop, based on a result of a comparison between the threshold voltage level of each of verification cells and a pre-target level lower than a target level in the verification interval of the first program loop, among the multiple program loops PL1 to PL7. More specifically, when the number of cells each having a threshold voltage level higher than the pre-target level, among the verification cells, is less than a set number in the verification interval of the first program loop, the controller 202 may control the level of the second program voltage that is applied to the program word line in the voltage application interval of the second program loop to have an increase corresponding to a first level D1, compared to the level of the first program voltage that is applied to the program word line in the voltage application interval of the first program loop. Furthermore, when the number of cells each having a threshold voltage level higher than the pre-target level, among the verification cells, is the set number or more in the verification interval of the first program loop, the controller 202 may control the level of the second program voltage that is applied to the program word line in the voltage application interval of the second program loop to have an increase corresponding to a second level D2, compared to the level of the first program voltage that is applied to the program word line in the voltage application interval of the first program loop. In this case, the second level may be a level smaller than the first level.

In an embodiment, the controller 202 may select the program loop PL1 of the multiple program loops PL1 to PL7 as a first program loop, and may select, as a second program loop, the program loop PL2 that is subsequent to the program loop PL1. Accordingly, the controller 202 may adjust (D1 or D2) an increase in the level of the program voltage PGM2 that is applied to the program word line in the voltage application interval of the program loop PL2, with respect to the level of the program voltage PGM1 that is applied to the program word line in the voltage application interval of the program loop PL1, based on a result of a comparison between the threshold voltage level of each of verification cells (hereinafter referred to as "first verification cells") that have been selected to verify a program state based on the level of the first verification voltage V1 (hereinafter referred to as a "first program state") and the level of the first pre-verification voltage PV1 lower than the level of the first verification voltage V1 in the verification interval of the program loop PL1. That is, based on a result of a comparison between the number of cells each having a threshold voltage level higher than the level of the first pre-verification voltage PV1, among the first verification cells, and a set number in the verification interval of the program loop PL1, the controller 202 may adjust (D1 or D2) how much an increase will the level of the program voltage PGM2 that has been used in the program loop PL2 have, compared to the level of the program voltage PGM1 that has been used in the program loop PL1. This drawing exemplifies a case in which the number of cells each having a threshold voltage level higher than the first pre-verification voltage PV1, among the first verification cells, is checked to be less than the set number in the verification interval of the program loop PL1. Accordingly, in this drawing, the level of the program voltage PGM2 that has been used in the program loop PL2 may have the increase corresponding to the first level D1, compared to the level of the program voltage PGM1 that has been used in the program loop PL1.

In another embodiment, the controller 202 may select the program loop PL3 of the multiple program loops PL1 to PL7 as a first program loop, and may select, as a second program loop, the program loop PL4 that is subsequent to the program loop PL3. Accordingly, the controller 202 may adjust (D1 or D2) an increase in the level of the program voltage PGM4 that is applied to the program word line in the voltage application interval of the program loop PL4, with respect to the level of the program voltage PGM3 that is applied to the program word line in the voltage application interval of the program loop PL3, based on a result of a comparison between the threshold voltage level of each of the first verification cells and the level of the first pre-verification voltage PV1 lower than the level of the first verification voltage V1 in the verification interval of the program loop PL3. That is, based on a result of a comparison between the number of cells each having a threshold voltage level higher than the level of the first pre-verification voltage PV1, among the first verification cells, and a set number in the verification interval of the program loop PL3, the controller 202 may adjust (D1 or D2) how much an increase will the level of the program voltage PGM4 that has been used in the program loop PL4 have, compared to the level of the program voltage PGM3 that has been used in the program loop PL3. This drawing exemplifies a case in which the number of cells each having a threshold voltage level higher than the first pre-verification voltage PV1, among the first verification cells, is checked to be the set number or more in the verification interval of the program loop PL3. Accordingly, in this drawing, the level of the program voltage PGM4 that has been used in the program loop PL4 may have the increase corresponding to the second level D2, compared to the level of the program voltage PGM3 that has been used in the program loop PL3. In this case, the second level D2 may be a level smaller than the first level D1.

The controller 202 may apply the pre-verification voltages PV1, PV2, and PV3 and the verification voltages V1, V2, and V3 to the program word line in the verification intervals. That is, the controller 202 may use a double verify PGM (DPGM) method using the two verification voltages in order to check one program state in the verification intervals. The controller 202 may detect a voltage or a current that is output through a bit line to which each of verification cells has been connected and determine whether each of the verification cells has a program pass or fail state based on the results of the detection, in the verification interval.

The controller 202 may perform a program verification operation for at least one of multiple program states in the verification interval. For example, if each of the multiple memory cells is divided into four program states on the basis of three threshold voltage levels, in order to check the four program states for verification cells, the controller 202 may apply, to the program word line, the three verification voltages V1, V2, and V3 corresponding to the three threshold voltage levels, that is, a target level, and the three pre-verification voltages PV1, PV2, and PV3 corresponding to a pre-target level lower than a target level. That is, the controller 202 may check the state in which the threshold voltage levels of the verification cells are adjacent to each of the four program states by applying, to the program word line, each of the three pre-verification voltages PV1, PV2, and PV3 each having the pre-target level lower than the target level in the verification interval. Furthermore, the controller 202 may check the state in which the threshold voltage level of each of the verification cells has reached to each of the four program states by applying, to the program word line, each of the three verification voltages V1, V2, and V3 having the target level in the verification interval.

In this case, if cells, among the verification cells, have different target levels, verification operations for the cells may be divided. For example, if cells having the first verification voltage V1 as a target level, that is, cells each having a threshold voltage level compared to the level of the first pre-verification voltage PV1 and the level of the first verification voltage V1, are included in the verification cells, the controller 202 might not compare the threshold voltage level of each of the cells with the level of the second pre-verification voltage PV2 and the level of the second verification voltage V2 and with the level of the third pre-verification voltage PV3 and the level of the third verification voltage V3. Furthermore, if cells having the second verification voltage V2 as a target level, that is, cells each having a threshold voltage level compared with the level of the second pre-verification voltage PV2 and the level of the second verification voltage V2, are included in the verification cells, the controller 202 might not compare the threshold voltage level of each of the cells with the level of the first pre-verification voltage PV1 and the level of the first verification voltage V1 and with the level of the third pre-verification voltage PV3 and the level of the third verification voltage V3. Furthermore, if cells each having the third verification voltage V3 as a target level, that is, cells each having a threshold voltage level compared with the level of the third pre-verification voltage PV3 and the level of the third verification voltage V3, are included in the verification cells, the controller 202 might not compare the threshold voltage level of each of the cells with the level of the first pre-verification voltage PV1 and the level of the first verification voltage V1 and with the level of the second pre-verification voltage PV2 and the level of the second verification voltage V2.

In particular, if verification cells are cells corresponding to threshold voltage levels having the lowest target level in the verification interval of a first program loop, among the multiple program loops PL1 to PL7, the controller 202 according to an embodiment of the present disclosure may adjust an increase in the level of a program voltage that is applied to the program word line in the voltage application interval of a second program loop that is performed subsequently to the first program loop, based on a result of a comparison between the threshold voltage level of each of the cells with a pre-target level lower than a target level.

In contrast, if verification cells are cells corresponding to other threshold voltage levels except a threshold voltage level having the lowest target level in the verification interval of a first program loop, among the multiple program loops PL1 to PL7, the controller 202 may fix, to a specific level, an increase in the level of a program voltage that is applied to the program word line in the voltage application interval of a second program loop that is performed subsequently to the first program loop, regardless of the results of a comparison between the threshold voltage levels of the cells and a pre-target level lower than a target level.

In an embodiment, the controller 202 may check how much has the threshold voltage level of each of second verification cells been adjacent to or reached a first program state through an operation of comparing the threshold voltage level of each of the first verification cells with the level of the first pre-verification voltage PV1 and the level of the first verification voltage V1 in the verification interval. In this case, since the controller 202 has checked that the target level of the first verification cells was the lowest level of the first verification voltage V1, among the levels of the three verification voltages V1, V2, and V3, the controller 202 may check the number of cells each having a threshold voltage level equal to or higher than the level of the first pre-verification voltage PV1, among the first verification cells, and may adjust (D1 or D2) the level of a program voltage that is applied to the program word line in the voltage application interval of a program loop to be subsequently performed, based on a result of the check. From this drawing, it may be seen that the number of cells each having a threshold voltage level equal to or higher than the level of the first pre-verification voltage PV1, among the first verification cells, is checked in each of the program loops PL1 to PL3, and the level of a program voltage that is applied to the program word line is adjusted (D1 or D2) in the voltage application intervals of the program loops PL2 to PL4 that are performed subsequently based on the results of the check.

In another embodiment, the controller 202 may check how much has the threshold voltage level of each of verification cells (hereinafter referred to as "second verification cells"), which have been selected in order to verify a program state based on the level of the second verification voltage V2 (hereinafter referred to as a "second program state") in the verification interval, been adjacent to or reached a second program state through an operation of comparing the threshold voltage level of each of the selected verification cells with the level of the second pre-verification voltage PV2 and the level of the second verification voltage V2. In this case, since the controller 202 has checked that the target level of each of the second verification cells was the level of the second verification voltage V2, that is, an intermediate level, among the levels of the three verification voltages V1, V2, and V3, the controller 202 may fix, to the specific level D2, the level of a program voltage that is applied to the program word line in the voltage application interval of a program loop to be subsequently performed, regardless of the number of cells each having a threshold voltage level equal to or higher than the level of the second pre-verification voltage PV2, among the second verification cells. From this drawing, it may be seen that the number of cells each having a threshold voltage level equal to or higher than the level of the second pre-verification voltage PV2, among the second verification cells, is checked in each of the program loops PL4 PL6, and the level of a program voltage that is applied to the program word line is fixed to the second level D2 in the voltage application intervals of the program loops PL5 to PL7 that are performed subsequently based on the results of the check.

For reference, an operation of checking whether the state of verification cells has reached a target program state based on a result of a comparison between the threshold voltage level of each of the verification cells and a target level may be an operation different from the aforementioned characteristic operation of the present disclosure, that is, an operation of adjusting an increase in the level of a program voltage in the voltage application interval of a second program loop based on a result of a comparison between the threshold voltage level of each of the verification cells and a pre-target level, which has been performed in the verification interval of a first program loop. For example, in this drawing, a program loop in which the number of cells each having a threshold voltage level higher than the level of the first pre-verification voltage PV1, among the first verification cells, is checked to be the set number or more may be PL3. However, in the program loop PL5 later than the program loop PL3, the state of each of the first verification cells may reach the target program state (i.e., a verification operation for the first verification cells might not be performed from the program loop PL6).

Furthermore, the controller 202 may determine the program operation to be a fail if the program operation is not successful within the preset number of program loops.

To put it shortly, the controller 202 according to an embodiment of the present disclosure may control an increase in the level of a program voltage that is applied to the program word line to have the first level D1 while some program loops that are initially performed, among the multiple program loops PL1 to PL7, are repeated, and may then control the increase to have the second level D2 smaller than the first level D1 in the remaining program loops. Accordingly, the controller 202 may raise the threshold voltage levels of the program cells at a very high speed while some program loops that are initially performed, among the multiple program loops PL1 to PL7, are repeated, and may stably raise the threshold voltage levels of the program cells in the remaining program loops. As a result, in an embodiment, the number of program loops necessary for the success of the program operation can be minimized, and memory cells can have an effective distribution. In this drawing, the controller 202 may control an increase in the level of a program voltage that is applied to the program word line to have the first level D1 while the program loops PL1 to PL3, among the multiple program loops PL1 to PL7, are repeated, and may control an increase in the level of the program voltage that is applied to the program word line to have the second level D2 smaller than the first level D1 in the remaining program loops following the program loop PL4 are repeated.

FIGS. 2A to 2C are diagrams for describing processes of distributions of cells being changed by control of the program operation of the memory device according to an embodiment of the present disclosure, which has been described with reference to FIG. 1. As used herein, the tilde "~" indicates a range of components.

Referring to FIG. 2A together with FIG. 1, it may be seen that the distribution of cells illustrated in FIG. 2A is a distribution of cells corresponding to the program loop PL1 or PL2, among the multiple program loops PL1 to PL7 that have been included in the program operation.

Specifically, it may be seen that after the program voltage PGM1 or PGM2 that has been included in the program loop PL1 or PL2 is applied, a verification operation using the first pre-verification voltage PV1 and the first verification voltage V1 is performed on the first verification cells having the lowest level of the first verification voltage V1, among the levels of the three verification voltages V1, V2, and V3, as a target level. Since the number of cells each having a threshold voltage level equal to or higher than the level of the first pre-verification voltage PV1, among the first verification cells, is less than the set number, the level of the program voltage PGM2 or PGM3 that has been included in the program loop PL2 or PL3 may have the increase corresponding to the first level D1, compared to the level of the program voltage PGM1 or PGM2 that has been included in the program loop PL1 or PL2.

Referring to FIG. 2B together with FIG. 1, it may be seen that the distribution of cells illustrated in FIG. 2B is a distribution of cells corresponding to the program loop PL3, among the multiple program loops PL1 to PL7 that have been included in the program operation.

Specifically, it may be seen that after the program voltage PGM3 that has been included in the program loop PL3 is applied, the verification operation using the first pre-verification voltage PV1 and the first verification voltage V1 may be performed on the first verification cells having the lowest level of the first verification voltage V1, among the levels of the three verification voltages V1, V2, and V3, as a target level. Since the number of cells each having a threshold voltage level equal to or higher than the level of the first pre-verification voltage PV1, among the first verification cells, is the set number or more, the level of the program voltage PGM4 that has been included in the program loop PL4 may have the increase corresponding to the second level D2, compared to the level of the program voltage PGM3 that has been included in the program loop PL3. That is, the level of the program voltage PGM2 or PGM3 that has been included in the program loop PL2 or PL3 may have the increase corresponding to the first level D1, compared to the level of the program voltage PGM1 or PGM2 that has been included in the program loop PL1 or PL2. In contrast, the level of the program voltage PGM4 that has been included in the program loop PL4 may have the increase corresponding to the second level D2, compared to the level of the program voltage PGM3 that has been included in the program loop PL3.

Referring to FIG. 2C together with FIG. 1, it may be seen that the distribution of cells illustrated in FIG. 2C is a distribution of cells corresponding to the program loop PL6, among the multiple program loops PL1 to PL7 that have been included in the program operation.

Specifically, after the program voltage PGM6 that has been included in the program loop PL6 is applied, it may be seen that a verification operation using the second pre-verification voltage PV2 and the second verification voltage V2 is performed on the second verification cells having the level of the second verification voltage V2, that is, an intermediate level, among the levels of the three verification voltages V1, V2, and V3, as a target level. Although the number of cells each having a threshold voltage level equal to or higher than the level of the second pre-verification voltage PV2, among the second verification cells, is the set number or more, the level of the program voltage PGM7 that has been included in the program loop PL7 may have the increase corresponding to the second level D2, compared to the level of the program voltage PGM6 that has been included in the program loop PL6. That is, it may be seen that after the level of the program voltage PGM4 that has been included in the program loop PL4 is changed in a form having the increase corresponding to the second level D2 compared to the level of the program voltage PGM3 that has been included in the program loop PL3, the increase is fixed to the second level D2 in the remaining program loops subsequent to the program loop PL4.

FIG. 3 is a diagram for describing another example of a method of controlling a program operation in the memory device according to an embodiment of the present disclosure.

Referring to FIG. 3, it may be seen that the example of FIG. 3 is an example in which the same memory device 150 as the memory device that has been described with reference to FIG. 1 operates according to a method different from the method that has been described with reference to FIG. 1. That is, hereinafter, a portion that is different from the operation of the memory device 150 that has been described with reference to FIG. 1 will be described.

Specifically, the controller 202 may perform, on a selected region of the memory cell array 201, a program operation including multiple program loops PL1 to PL7. In this case, the controller 202 may program a memory cell that has been selected as a program target so that the memory cell has any one of multiple program states by repeatedly performing the multiple program loops PL1 to PL7 one by one in a set order until the program operation is completed.

In particular, in the controller 202 that has been disclosed in FIG. 3, each of the multiple program loops PL1 to PL7 may include a voltage application interval in which the threshold voltage levels of cells that have been connected to a program word line are changed by applying the program voltages PGM1 to PGM7 to the program word line, and a verification interval in which whether the state of each of verification cells, among program cells, is which one of four program states is checked by applying, to the program word line, three verification voltages V1, V2, and V3 each corresponding to a target level, three pre-verification voltages PV1, PV2, and PV3 each having a first pre-target level lower than the target level, and three additional verification voltages PPV1, PPV2, and PPV3 each having a second pre-target level lower than the first pre-target level.

More specifically, the controller 202 may apply the program voltages PGM1 to PGM7 to the program word line in the voltage application intervals. Accordingly, each of the program cells may be programmed to have any one of the multiple program states. Furthermore, in the voltage application intervals, the controller 202 may apply a high program permission voltage to a bit line that has been connected to cells each having a threshold voltage level lower than the second pre-target level, may apply an intermediate program permission voltage to a bit line that has been connected to cells each having a threshold voltage level that is higher than the second pre-target level and lower than the first pre-target level, may apply a low program permission voltage to a bit line that has been connected to cells each having a threshold voltage level that is higher than the first pre-target level and lower than a target level, and may apply a program inhibition voltage to a bit line that has been connected to cells each having a threshold voltage level higher than the target level. In an embodiment, the high program permission voltage may be a ground voltage, the intermediate program permission voltage may be 0.25 V, the low program permission voltage may be 0.5 V, and the program inhibition voltage may be a source voltage.

Furthermore, before starting the voltage application interval in each of the multiple program loops PL1 to PL7, the controller 202 may perform a bit line precharge operation of precharging each of multiple bit lines BL1 to BLm that have been connected to the multiple memory cells to a set potential level, for example, a high program permission potential level, an intermediate program permission potential level, a low program permission potential level, or a program inhibition potential level.

The potential level of the program voltage may be increased whenever each of the multiple program loops PL1 to PL7 is performed. That is, in the program operation, the level of the program voltage may be increased according to the ISPP method as each of the multiple program loops PL1 to PL7 is repeatedly performed. The number of program voltages applied, a voltage level, and a voltage application time, which are used in each of the multiple program loops PL1 to PL7, may be determined in various forms.

In particular, the controller 202 according to an embodiment of the present disclosure may adjust an increase in the level of the program voltage that is applied to the program word line in the voltage application interval of a second program loop that is performed subsequently to a first program loop, based on a result of a comparison between the threshold voltage level of each of verification cells and a target level and a second pre-target level lower than a first pre-target level in the verification interval of the first program loop, among the multiple program loops PL1 to PL7. More specifically, when the number of cells each having a threshold voltage level higher than the second pre-target level, among the verification cells, is less than a set number in the verification interval of the first program loop, the controller 202 may control the level of the second program voltage that is applied to the program word line to have an increase corresponding to a first level D1 in the voltage application interval of the second program loop, compared to the level of the first program voltage that is applied to the program word line in the voltage application interval of the first program loop. Furthermore, when the number of cells each having a threshold voltage level higher than the second pre-target level, among the verification cells, is the set number or more in the verification interval of the first program loop, the controller 202 may control an increase corresponding to a second level D2 that is applied to the program word line to have the level of the second program voltage in the voltage application interval of the second program loop, compared to the level of the first program voltage that is applied to the program word line in the voltage application interval of the first program loop. In this case, the second level D2 may be a level smaller than the first level D1.

In an embodiment, the controller 202 may select the program loop PL1, among the multiple program loops PL1 to PL7, as a first program loop, and may select, as a second program loop, the program loop PL2 that is subsequent to the program loop PL1. Accordingly, the controller 202 may adjust (D1 or D2) an increase in the level of the program voltage PGM2 that is applied to the program word line in the voltage application interval of the program loop PL2, compared to the level of the program voltage PGM1 that is applied to the program word line in the voltage application interval of the program loop PL1, based on a result of a comparison between the threshold voltage level of each of the first verification cells that have been selected in order to verify a first program state in the verification interval of the program loop PL1 and the level of the first additional verification voltage PPV1 lower than the levels of the first verification voltage V1 and the first pre-verification voltage PV1. That is, the controller 202 may adjust (D1 or D2) how much an increase will the level of the program voltage PGM2 that has been used in the program loop PL2 have, compared to the level of the program voltage PGM1 that has been used in the program loop PL1, based on a result of a comparison between the number of cells each having a threshold voltage level higher than the level of the first additional verification voltage PPV1, among the first verification cells, and the set number in the verification interval of the program loop PL1. This drawing exemplifies a case in which the number of cells each having a threshold voltage level higher than the first additional verification voltage PPV1, among the first verification cells, is checked to be less than the set number in the verification interval of the program loop PL1. Accordingly, in this drawing, the level of the program voltage PGM2 that has been used in the program loop PL2 may have the increase corresponding to the first level D1, compared to the level of the program voltage PGM1 that has been used in the program loop PL1.

In another embodiment, the controller 202 may select the program loop PL3, among the multiple program loops PL1 to PL7, as a first program loop, and may select, as a second program loop, the program loop PL4 that is subsequent to the program loop PL3. Accordingly, the controller 202 may adjust (D1 or D2) an increase in the level of the program voltage PGM4 that is applied to the program word line in the voltage application interval of the program loop PL4, compared to the level of the program voltage PGM3 that is applied to the program word line in the voltage application interval of the program loop PL3, based on a result of a comparison between the threshold voltage level of each of the first verification cells and the level of the first additional verification voltage PPV1 that is lower than the level of the first verification voltage V1 and the level of the first pre-verification voltage PV1 in the verification interval of the program loop PL3. That is, the controller 202 may adjust (D1 or D2) how much an increase will the level of the program voltage PGM4 that has been used in the program loop PL4 have, compared to the level of the program voltage PGM3 that has been used in the program loop PL3, based on a result of a comparison between the number of cells each having a threshold voltage level higher than the level of the first additional verification voltage PPV1, among the first verification cells, and the set number in the verification interval of the program loop PL3. This drawing exemplifies a case in which the number of cells each having a threshold voltage level higher than the first additional verification voltage PPV1, among the first verification cells, is checked to be the set number or more in the verification interval of the program loop PL3. Accordingly, in this drawing, the level of the program voltage PGM4 that has been used in the program loop PL4 may have the increase corresponding to the second level D2, compared to the level of the program voltage PGM3 that has been used in the program loop PL3. In this case, the increase corresponding to the second level D2 may be a level smaller than the increase corresponding to the first level D1.

The controller 202 may apply the additional verification voltages PPV1, PPV2, and PPV3, the pre-verification voltages PV1, PV2, and PV3, and the verification voltages V1, V2, and V3 to the program word line in the verification intervals. That is, the controller 202 may use a triple verify PGM (TPGM) method using the three verification voltages in order to check one program state in the verification intervals.

The controller 202 may perform a program verification operation for at least one of the multiple program states in the verification interval. For example, if the state of each of the multiple memory cells is divided into four program states on the basis of three threshold voltage levels, in order to divide the four program states for each of verification cells, the controller 202 may apply, to the program word line, the three verification voltages V1, V2, and V3 corresponding to three threshold voltage levels each being a target level, the three pre-verification voltages PV1, PV2, and PV3 each corresponding to a first pre-target level lower than the target level, and the three additional verification voltages PPV1, PPV2, and PPV3 each corresponding to a second pre-target level lower than the first pre-target level. That is, the controller 202 may check how much has the threshold voltage level of each of the verification cells been adjacent to the four program states by applying, to the program word line, each of the three pre-verification voltages PV1, PV2, and PV3 each having the first pre-target level lower than the target level and each of the three additional verification voltages PPV1, PPV2, and PPV3 each having the second pre-target level lower than the first pre-target level in the verification interval. Furthermore, the controller 202 may check the state in which the threshold voltage level of each of the verification cells has reached to each of the four program states by applying, to the program word line, each of the three verification voltages V1, V2, and V3 each having the target level in the verification interval.

In this case, if cells, among the verification cells, are cells having different target levels, verification operations for the cells may be divided. For example, if cells each having the first verification voltage V1 as a target level, that is, cells each having a threshold voltage level compared with the level of the first additional verification voltage PPV1, the level of the first pre-verification voltage PV1, and the level of the first verification voltage V1 are included in the verification cells, the controller 202 might not compare the threshold voltage level of each of the cells with the level of the second additional verification voltage PPV2, the level of the second pre-verification voltage PV2, the level of the second verification voltage V2 and with the level of the third additional verification voltage PPV3, the level of the third pre-verification voltage PV3, and the level of the third verification voltage V3. Furthermore, if cells each having the second verification voltage V2 as a target level, that is, cells each having a threshold voltage level compared with the level of the second additional verification voltage PPV2, the level of the second pre-verification voltage PV2, and the level of the second verification voltage V2 are included in the verification cells, the controller 202 might not compare the threshold voltage level of each of the cells with the level of the first additional verification voltage PPV1, the level of the first pre-verification voltage PV1, and the level of the first verification voltage V1 and with the level of the third additional verification voltage PPV3, the level of the third pre-verification voltage PV3, and the level of the third verification voltage V3. Furthermore, if cells each having the third verification voltage V3 as a target level, that is, cells each having the threshold voltage level compared with the level of the third additional verification voltage PPV3, the level of the third pre-verification voltage PV3, and the level of the third verification voltage V3 are included in the verification cells, the controller 202 might not compare the threshold voltage level of each of the cells with the level of the first additional verification voltage PPV1, the level of the first pre-verification voltage PV1, and the level of the first verification voltage V1 and with the level of the second additional verification voltage PPV2, the level of the second pre-verification voltage PV2, and the level of the second verification voltage V2.

In particular, if verification cells are cells corresponding to threshold voltage levels having the lowest target level in the verification interval of a first program loop, among the multiple program loops PL1 to PL7, the controller 202 according to an embodiment of the present disclosure may adjust an increase in the level of a program voltage that is applied to the program word line in the voltage application interval of a second program loop that is performed subsequently to the first program loop, based on a result of a comparison between the threshold voltage level of each of the cells and a target level and a second pre-target level lower than a first pre-target level.

In contrast, if verification cells are cells corresponding to other threshold voltage levels except a threshold voltage level having the lowest target level in the verification interval of a first program loop, among the multiple program loops PL1 to PL7, the controller 202 may fix, to a specific level, an increase in the level of a program voltage that is applied to the program word line in the voltage application interval of a second program loop that is performed subsequently to a first program loop, regardless of the results of a comparison between the threshold voltage level of each of the cells and a target level and the second pre-target level lower than the first pre-target level.

In an embodiment, the controller 202 may check how much has the threshold voltage level of each of the first verification cells been adjacent to or reached a first program state through an operation of comparing the threshold voltage level of each of the first verification cells with the level of the first additional verification voltage PPV1, the level of the first pre-verification voltage PV1, and the level of the first verification voltage V1 in the verification interval. In this case, since the controller 202 has checked that the target level of each of the first verification cells is the lowest level of the first verification voltage V1, among the levels of the three verification voltages V1, V2, and V3, the controller 202 may check the number of cells each having a threshold voltage level equal to or higher than the level of the first additional verification voltage PPV1, among the first verification cells, and may adjust (D1 or D2) the level of a program voltage that is applied to the program word line in the voltage application interval of a program loop to be subsequently performed, based on a result of the check. From this drawing, it may be seen that the number of cells each having a threshold voltage level equal to or higher than the level of the first additional verification voltage PPV1, among the first verification cells, is checked in each of the program loops PL1 to PL3 and the level of a program voltage that is applied to the program word line is adjusted (D1 or D2) in the voltage application intervals of the program loops PL2 to PL4 that are performed subsequently, based on the results of the check.

In another embodiment, the controller 202 may check how much has the threshold voltage level of each of second verification cells, which have been selected in order to verify a second program state, been adjacent to or reached a second program state through an operation of comparing the threshold voltage level of each of the second verification cells with the level of the second additional verification voltage PPV2, the level of the second pre-verification voltage PV2, and the level of the second verification voltage V2 in the verification interval. In this case, since the controller 202 has checked that the target level of each of the second verification cells is the level of the second verification voltage V2, that is, an intermediate level, among the levels of the three verification voltages V1, V2, and V3, the controller 202 may fix, to the specific level D2, the level of a program voltage that is applied to the program word line in the voltage application interval of a program loop to be subsequently performed, regardless of the number of cells each having a threshold voltage level equal to or higher than the level of the second additional verification voltage PPV2, among the second verification cells. From this drawing, it may be seen that the number of cells each having a threshold voltage level equal to or higher than the level of the second additional verification voltage PPV2, among the second verification cells, is checked in each of the program loops PL4 to PL6 and the level of a program voltage that is applied to the program word line is fixed to the second level D2 in the voltage application intervals of the program loops PL5 to PL7 that are performed subsequently, based on the results of the check.

To put it shortly, the controller 202 according to an embodiment of the present disclosure may control an increase in the level of a program voltage that is applied to the program word line to have the first level D1 while some program loops that are initially performed, among the multiple program loops PL1 to PL7, are repeated, and may then control the increase to have the second level D2 smaller than the first level D1 in the remaining program loops. Accordingly, the controller 202 may raise the threshold voltage levels of program cells at a very high speed while some program loops that are initially performed, among the multiple program loops PL1 to PL7, are repeated, and may stably raise the threshold voltage levels of the program cells in the remaining program loops. As a result, in an embodiment, the number of program loops necessary for the success of the program operation can be minimized, and memory cells can have an effective distribution. In this drawing, the controller 202 may control an increase in the level of a program voltage that is applied to the program word line to have the first level D1 while the program loops PL1 to PL3, among the multiple program loops PL1 to PL7, are repeated, and may control the increase in the level of the program voltage that is applied to the program word line to have the second level D2 smaller than the first level D1 while the remaining program loops following the program loop PL4 are repeated.

For reference, FIG. 3 has disclosed the construction in which the controller 202 adjusts an increase in the level of a program voltage that is applied to a program word line in the voltage application interval of a subsequent program loop, based on the number of cells that has been verified on the basis of the level of the lowest verification voltage, among the three verification voltages, in the TPGM method using the three verification voltages in order to check one program state in the verification interval of the subsequent program loop. However, this is merely an embodiment. In the case of a method using verification voltages greater than three verification voltages in order to check one program state, a construction in which the controller 202 adjusts an increase in the level of a program voltage that is applied to a program word line in the voltage application interval of a subsequent program loop based on the number of cells that has been verified on the basis of the level of the lowest verification voltage, among the verification voltages greater than the three verification voltages, may be possible.

Figure 4A:
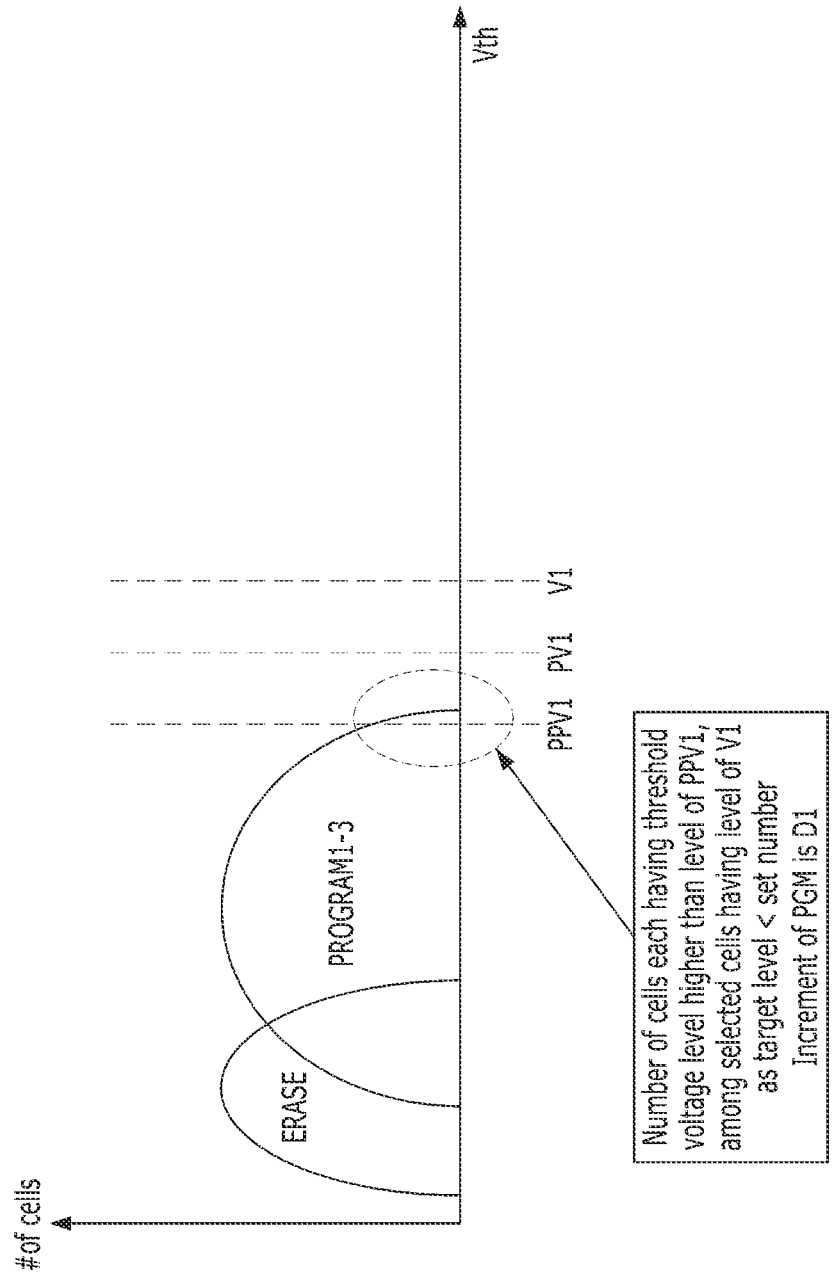

FIGS. 4A to 4C are diagrams for describing processes of distributions of cells being changed by control of the program operation of the memory device according to an embodiment of the present disclosure, which has been described with reference to FIG. 3. As used herein, the tilde "~" indicates a range of components.

Referring to FIG. 4A together with FIG. 3, it may be seen that the distribution of cells illustrated in FIG. 4A is a distribution of cells corresponding to the program loop PL1 or PL2, among the multiple program loops PL1 to PL7 that have been included in the program operation.

Specifically, it may be seen that after the program voltage PGM1 or PGM2 that has been included in the program loop PL1 or PL2 is applied, a verification operation using the first additional verification voltage PPV1, the first pre-verification voltage PV1, and the first verification voltage V1 is performed on the first verification cells each having the lowest level of the first verification voltage V1, among the levels of the three verification voltages V1, V2, and V3, as a target level. Since the number of cells each having a threshold voltage level equal to or higher than the level of the first additional verification voltage PPV1, among the first verification cells, is less than the set number, the level of the program voltage PGM2 or PGM3 that has been included in the program loop PL2 or PL3 may have the increase corresponding to the first level D1, compared to the level of the program voltage PGM1 or PGM2 that has been included in the program loop PL1 or PL2.

Referring to FIG. 4B together with FIG. 3, it may be seen that the distribution of cells illustrated in FIG. 4B is a distribution of cells corresponding to the program loop PL3, among the multiple program loops PL1 to PL7 that have been included in the program operation.

Specifically, it may be seen that after the program voltage PGM3 that has been included in the program loop PL3 is applied, a verification operation using the first additional verification voltage PPV1, the first pre-verification voltage PV1, and the first verification voltage V1 is performed on the first verification cells each having the lowest level of the first verification voltage V1, among the levels of the three verification voltages V1, V2, and V3, as a target level. Since the number of cells each having a threshold voltage level equal to or higher than the level of the first additional verification voltage PPV1, among the first verification cells, is the set number or more, the level of the program voltage PGM4 that has been included in the program loop PL4 may have the increase corresponding to the second level D2, compared to the level of the program voltage PGM3 that has been included in the program loop PL3. That is, the level of the program voltage PGM1 or PGM2 that has been included in the program loop PL2 or PL3 may have the increase corresponding to the first level D1 compared to the level of the program voltage PGM1 or PGM2 that has been included in the program loop PL1 or PL2. In contrast, the level of the program voltage PGM4 that has been included in the program loop PL4 may have the increase corresponding to the second level D2 compared to the level of the program voltage PGM3 that has been included in the program loop PL3.

Referring to FIG. 4C together with FIG. 3, it may be seen that the distribution of cells illustrated in FIG. 4C is a distribution of cells corresponding to the program loop PL6, among the multiple program loops PL1 to PL7 that have been included in the program operation.

Specifically, it may be seen that after the program voltage PGM6 that has been included in the program loop PL6 is applied, a verification operation using the second additional verification voltage PPV2, the second pre-verification voltage PV2, and the second verification voltage V2 is performed on the second verification cells each having the level of the second verification voltage V2, that is, an intermediate level, among the levels of the three verification voltages V1, V2, and V3, as a target level. Although the number of cells each having a threshold voltage level equal to or higher than the level of the second additional verification voltage PPV2, among the second verification cells, is the set number or more, the level of the program voltage PGM7 that has been included in the program loop PL7 may have the increase corresponding to the second level D2, compared to the level of the program voltage PGM6 that has been included in the program loop PL6. That is, it may be seen that the level of the program voltage PGM4 that has been included in the program loop PL4 is changed in a form having the increase corresponding to the second level D2, compared to the level of the program voltage PGM3 that has been included in the program loop PL3, and the increase is fixed to the second level D2 in the remaining program loops subsequent to the program loop PL4.

Figure 5:
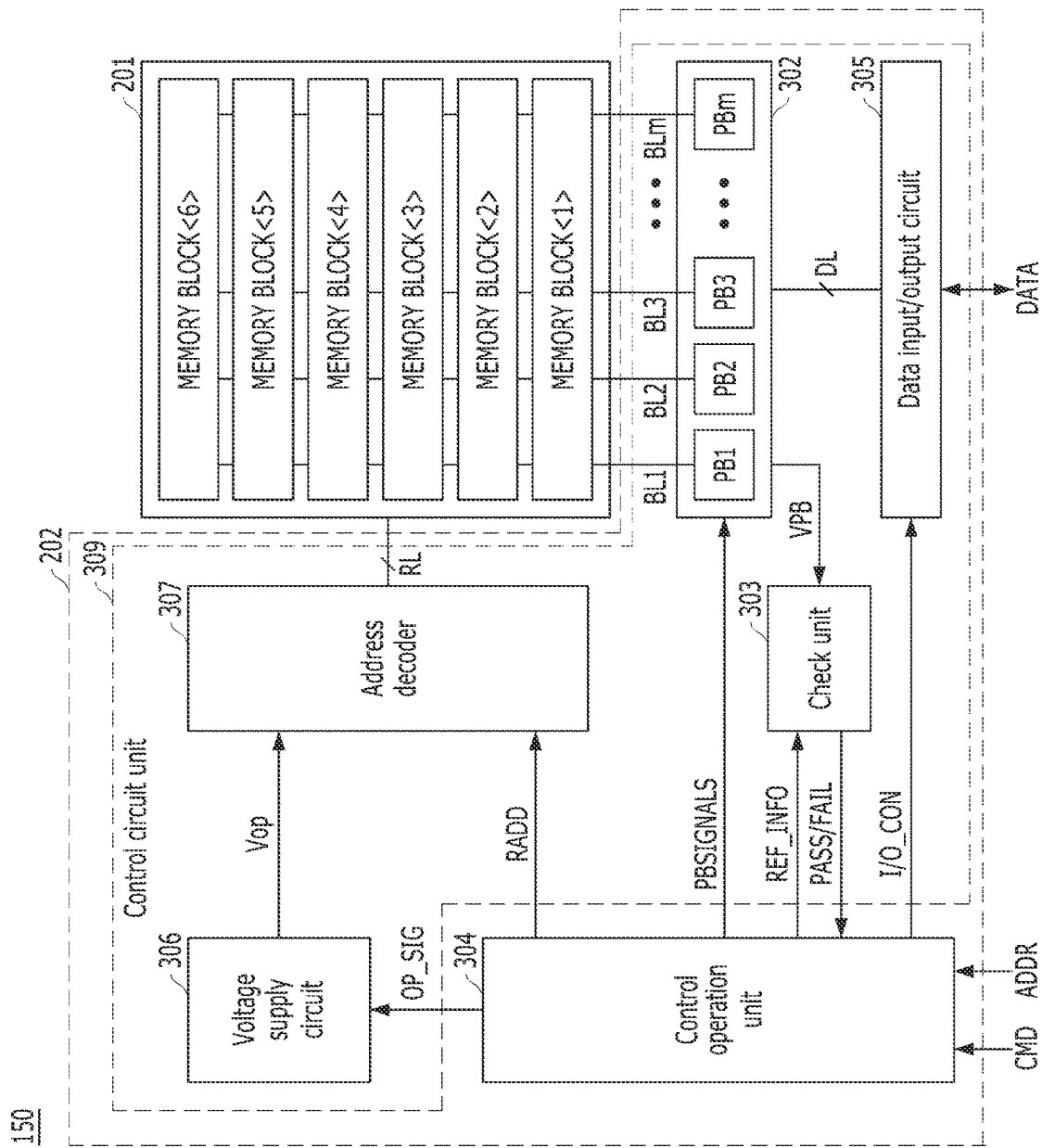
FIG. 5 is a diagram for describing a detailed construction of the memory device according to an embodiment of the present disclosure.

FIG. 5 is a diagram for describing a detailed construction of the memory device according to an embodiment of the present disclosure.

Referring to FIG. 5, the memory device 150 may include the memory cell array 201 and the controller 202. The controller 202 may include a control circuit unit 309 and a control operation unit 304. Furthermore, the control circuit unit 309 may include a page buffer unit 302, a check unit 303, a data input/output circuit 305, a voltage supply circuit 306, and an address decoder 307.

The memory cell array 201 may include a plurality of memory blocks MEMORY BLOCK<1:6>. The plurality of memory blocks MEMORY BLOCK<1:6> may be connected to an address decoder 307 through a row line RL. The plurality of memory blocks MEMORY BLOCK<1:6> may be connected to the page buffer unit 302 through bit lines BL1 to BLm. Each of the memory blocks MEMORY BLOCK<1:6> may include a plurality of memory cells. In an embodiment, the plurality of memory cells may be nonvolatile memory cells. Memory cells connected to the same word line may be defined as one page. Accordingly, one memory block may include a plurality of pages.

The row line RL may include at least one source selection line, a plurality of word lines and at least one drain selection line.

The control circuit unit 309 may be configured to perform a program, read or erase operation on a selected region of the memory cell array 201. The control circuit unit 309 may drive the memory cell array 201. For example, the control circuit unit 309 may apply various operating voltages to the row line RL and the bit lines BL1 to BLm, or discharge the applied voltages.

The address decoder 307 among the control circuit unit 309 may be connected to the memory cell array 201 through the row line RL. The row line RL may include the drain selection line, the word lines, the source selection line and a common source line.

The address decoder 307 may be configured to operate in response to the control of the control operation unit 304. The address decoder 307 may receive an address RADD from the control operation unit 304.

The address decoder 307 may be configured to decode a block address of the received address RADD. The address decoder 307 may select at least one memory block among the memory blocks MEMORY BLOCK<1:6> according to the decoded block address. The address decoder 307 may be configured to decode a row address of the received address RADD. The address decoder 307 may select at least one word line among word lines of the selected memory block according to the decoded row address. The address decoder 307 may apply operating voltages Vop, which are supplied from the voltage supply circuit 306, to the selected word line.

A program operation may be performed in a page unit. In a program voltage application interval that has been included in the program operation, the address decoder 307 will apply a program voltage to a selected word line, and will apply, to an unselected word line, a pass voltage having a lower level than the program voltage. Referring to FIG. 5 together with FIG. 1, in a verification interval that has been included in the program operation, the address decoder 307 will apply the pre-verification voltages PV1, PV2, and PV3 and the verification voltages V1, V2, and V3 to the selected word line. Referring to FIG. 5 together with FIG. 3, in the verification interval that has been included in the program operation, the address decoder 307 will apply the additional verification voltages PPV1, PPV2, and PPV3, the pre-verification voltages PV1, PV2, and PV3, and the verification voltages V1, V2, and V3 to the selected word line.

The voltage supply circuit 306 of the control circuit unit 309 may be configured to generate multiple operating voltages Vop by using a power supply voltage that is supplied from the outside. The voltage supply circuit 306 may operate in response to control of the control operation unit 304. In particular, the voltage supply circuit 306 according to an embodiment of the present disclosure may adjust an increase in the level of a program voltage that is supplied to the address decoder 307 in the voltage application interval of a subsequent program loop, compared to the level of a program voltage that is supplied to the address decoder 307 in the voltage application interval of a previous program loop, in response to a level adjustment signal that has been included in an operation signal OP_SIG that has been applied by the control operation unit 304. For example, Referring to FIG. 5 together with FIG. 1, in response to the level adjustment signal that has been input by the control operation unit 304, the voltage supply circuit 306 may supply the program voltage PGM3 to the address decoder 307 so that the level of the program voltage PGM3 that has been included in the program loop PL3 has the increase corresponding to the first level D1, compared to the level of the program voltage PGM2 that has been included in the program loop PL2, and may supply the program voltage PGM4 to the address decoder 307 so that the level of the program voltage PGM4 that has been included in the program loop PL4 has the increase corresponding to the second level D2 compared to the level of the program voltage PGM3 that has been included in the program loop PL3.

In an embodiment, the voltage supply circuit 306 may regulate the external power supply voltage, and generate an internal power supply voltage.

In an embodiment, the voltage supply circuit 306 may generate the plurality of operating voltages Vop by using the external power supply voltage or the internal power supply voltage.

In an embodiment, the voltage supply circuit 306 may regulate the external power supply voltage, and generate an internal power supply voltage.

In an embodiment, the voltage supply circuit 306 may generate the plurality of operating voltages Vop by using the external power supply voltage or the internal power supply voltage. For example, the voltage supply circuit 306 may generate a plurality of erase voltages, a plurality of program voltages, a plurality of pass voltages, a plurality of selective read voltages and a plurality of unselective read voltages.

The voltage supply circuit 306 may include a plurality of pumping capacitors, which receive the internal power supply voltage, to generate the plurality of operating voltages Vop having various voltage levels, and generate the plurality of operating voltages Vop by selectively activating the plurality of pumping capacitors in response to the control of the control operation unit 304.

The generated operating voltages Vop may be supplied to the memory cell array 201 by the address decoder 307.

The page buffer unit 302 may include a plurality of page buffers PB1 to PBm. The plurality of page buffers PB1 to PBm may be connected to the memory cell array 201 through the plurality of bit lines BL1 to BLm, respectively. The plurality of page buffers PB1 to PBm may operate in response to the control of the control operation unit 304.

The plurality of page buffers PB1 to PBm may communicate data DATA with the data input/output circuit 305. During the program operation, the plurality of page buffers PB1 to PBm may receive the data DATA to be stored, through the data input/output circuit 305 and a data line DL.

When a program voltage is applied to a selected word line in a program voltage application interval that has been included in a program operation, the multiple page buffers PB1 to PBm will transfer the data DATA that has been received through the data input/output circuit 305, to a selected memory cell, through the bit lines BL1 to BLm. The memory cell of a selected page may be programmed based on the transferred data DATA. The threshold voltage of a memory cell that has been connected to a bit line to which a high program permission voltage (e.g., a ground voltage) is applied may rise by a first size. The threshold voltage of a memory cell that has been connected to a bit line to which an intermediate program permission voltage (e.g., 0.25 V) is applied may rise by a second size (smaller than the first size). The threshold voltage of a memory cell that has been connected to a bit line to which a low program permission voltage (e.g., 0.5 V) is applied may rise by a third size (smaller than the second size). The threshold voltage of a memory cell that has been connected to a bit line to which a program inhibition voltage (e.g., a power supply voltage) is applied may be maintained without being changed. In a verification interval that has been included in the program operation, the multiple page buffers PB1 to PBm may read, from a selected memory cell, the data DATA that has been stored in the selected memory cell through the bit lines BL1 to BLm. That is, in the verification interval, the multiple page buffers PB1 to PBm may adjust the potential levels of the bit lines BL1 to BLm based on a program state of the selected memory cell.

More specifically, for example, it may be assumed that selected memory cells are divided into four cell groups in accordance with three threshold voltage levels. A verification operation might not be performed on an erase cell group, among the four cell groups. In a verification operation for a first cell group among the four cell groups, only a page buffer corresponding to the first cell group, among the multiple page buffers PB1 to PBm, may selectively operate. The potential level of a bit line that has been connected to cells that have been included in the first cell group may be adjusted based on the program states of the cells that have been included in the first cell group. For example, referring to FIG. 5 together with FIG. 1, the potential level of the bit line that has been connected to the first cell group may be adjusted based on three program states having the level of the first pre-verification voltage PV1 and the level of the first verification voltage V1 as a reference. For example, referring to FIG. 5 together with FIG. 3, the potential level of the bit line that has been connected to the first cell group may be adjusted based on four program states having the level of the first additional verification voltage PPV1, the level of the first pre-verification voltage PV1, and the level of the first verification voltage V1 as a reference. In a verification operation for a second cell group among the four cell groups, only a page buffer corresponding to the second cell group, among the multiple page buffers PB1 to PBm, may selectively operate. The potential level of a bit line that has been connected to cells that have been included in the second cell group may be adjusted based on program states of the cells that have been included in the second cell group. For example, referring to FIG. 5 together with FIG. 1, the potential level of the bit line that has been connected to the second cell group may be adjusted based on three program states having the level of the second pre-verification voltage PV2 and the level of the second verification voltage V2 as a reference. For example, referring to FIG. 5 together with FIG. 3, the potential level of the bit line that has been connected to the second cell group may be adjusted based on four program states having the level of the second additional verification voltage PPV2, the level of the second pre-verification voltage PV2, and the level of the second verification voltage V2 as a reference. In a verification operation for a third cell group among the four cell groups, only a page buffer corresponding to the third cell group, among the multiple page buffers PB1 to PBm, may selectively operate. The potential level of a bit line that has been connected to cells that have been included in the third cell group may be adjusted based on program states of the cells that have been included in the third cell group. For example, referring to FIG. 5 together with FIG. 1, the potential level of the bit line that has been connected to the third cell group may be adjusted based on three program states having the level of the third pre-verification voltage PV3 and the level of the third verification voltage V3 as a reference. For example, referring to FIG. 5 together with FIG. 3, the potential level of the bit line that has been connected to the second cell group may be adjusted based on four program states having the level of the third additional verification voltage PPV3, the level of the third pre-verification voltage PV3, and the level of the third verification voltage V3 as a reference. The data input/output circuit 305 of the control circuit unit 309 may be connected to the multiple page buffers PB1 to PBm through a data line DL. The data input/output circuit 305 may operate in response to control of the control operation unit 304.

The data input/output circuit 305 may include a plurality of input/output buffers (not illustrated) that receive the data DATA inputted thereto. During the program operation, the data input/output circuit 305 may receive the data DATA to be stored from an external. The data input/output circuit 305 may output the data DATA, which is transmitted from the plurality of page buffers PB1 to PBm included in the page buffer unit 302, to the external during the read operation.

The check unit 303 of the control circuit unit 309 may determine whether the number of bit lines that has been connected to cells each having a threshold voltage level equal to or higher than a pre-target level, among bit lines that have been selected in the page buffer unit 302, is less than a set number in a verification interval that has been included in a program operation, and may generate a comparison signal having a PASS value or the FAIL value based on a result of the determination. For example, when the number of bit lines that has been connected to the cells each having the threshold voltage level equal to or higher than the pre-target level, among the bit lines that have been selected in the page buffer unit 302, is less than the set number, the check unit 303 may generate the comparison signal having the FAIL value and output the comparison signal to the control operation unit 304. For example, when the number of bit lines that has been connected to the cells each having the threshold voltage level equal to or higher than the pre-target level, among the bit lines that have been selected in the page buffer unit 302, is the set number or more, the check unit 303 may generate the comparison signal having the PASS value and output the comparison signal to the control operation unit 304. Referring to FIG. 5 together with FIG. 1, the pre-target level may be a level lower than a target level. Referring to FIG. 5 together with FIG. 3, the pre-target level may be a lower pre-target level, among two pre-target levels each lower than a target level.

Furthermore, in the verification interval that is included in the program operation, the check unit 303 may determine whether the number of bit lines that has been connected to cells each having a threshold voltage level equal to or higher than a target level, among bit lines that have been selected in the page buffer unit 302, is less than a reference number, and may generate the comparison signal having the PASS value or the FAIL value based on a result of the determination. For example, when the number of bit lines that has been connected to the cells each having the threshold voltage level equal to or higher than the target level, among the bit lines that have been selected in the page buffer unit 302, is less than the reference number, the check unit 303 may generate the comparison signal having the FAIL value and output the comparison signal to the control operation unit 304. For example, when the number of bit lines that has been connected to the cells each having the threshold voltage level equal to or higher than the target level, among the bit lines that have been selected in the page buffer unit 302, is the reference number or more, the check unit 303 may generate the comparison signal having the PASS value and output the comparison signal to the control operation unit 304.

More specifically, the check unit 303 may adjust the potential level of each of the selected bit lines, based on whether the threshold voltage level of each of cells that have been connected to the bit lines that have been selected in the page buffer unit 302 is a pre-target level, may then check whether each of the selected bit lines has a pass/fail state based on the potential level of each of the selected bit lines, may compare the number of cells that has been checked to have the pass state with a set number that has been applied by the control operation unit 304, and may generate the comparison signal having the PASS value or the FAIL value as a result of the comparison.

Furthermore, the check unit 303 may adjust the potential level of each of the selected bit lines based on whether the threshold voltage level of each of the cells that have been connected to the bit lines that have been selected in the page buffer unit 302 is a target level, may check whether each of the selected bit lines has the pass/fail state based on the potential level of each of the selected bit lines, may compare the number of cells that has been checked to have the pass state with the reference number that has been applied by the control operation unit 304, and may generate the comparison signal having the PASS value or the FAIL value as a result of the comparison.

In this case, the "set number" that is used as a determination criterion for the number of bit lines that has been connected to cells each having a threshold voltage level equal to or higher than a pre-target level in the check unit 303 and the "reference number" that is used as a determination criterion for the number of bit lines that has been connected to cells each having a threshold voltage level equal to or higher than a target level are values which may be defined by a number information signal REF_INFO that is transmitted from the control operation unit 304 to the check unit 303, and may have the same value or different values.

The control operation unit 304 may be connected to the address decoder 307, the voltage supply circuit 306, the page buffer unit 302, the data input/output circuit 305, and the check unit 303 that are included in the control circuit unit 309. The control operation unit 304 may be configured to control an overall operation of the memory device 150. The control operation unit 304 may operate in response to a command CMD that is transmitted by an external device.

The control operation unit 304 may control the control circuit unit 309 by generating various signals in response to the command CMD and an address ADDR. For example, the control operation unit 304 may generate the operation signal OPSIG, an address RADD, a read and write control signal PBSIGNALS, and the number information signal REF_INFO, in response to the command CMD and the address ADDR. The control operation unit 304 may output the operation signal OPSIG to the voltage supply circuit 306, may output the address RADD to the address decoder 307, may output the read and write control signal PBSIGNALS to the page buffer unit 302, and may output the number information signal REF_INFO to the check unit 303. Furthermore, the control operation unit 304 may determine whether a verification operation is a pass or fail in response to the comparison signal having the PASS value or the FAIL value, which has been output by the check unit 303.

Figure 6:
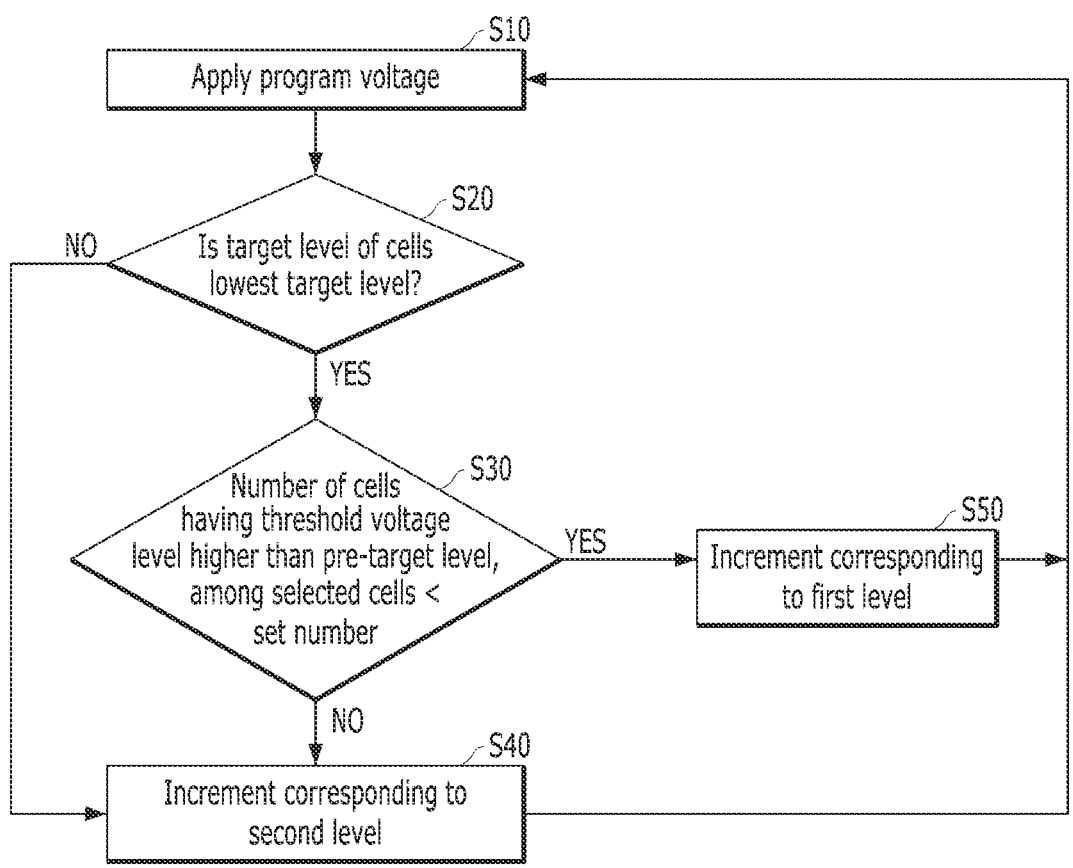
FIG. 6 is a flowchart for describing an operation of the memory device according to an embodiment of the present disclosure.

FIG. 6 is a flowchart for describing an operation of the memory device according to an embodiment of the present disclosure.

Referring to FIG. 6 together with FIG. 1, a program operation may include the multiple program loops PL1 to PL7. Furthermore, each of the multiple program loops PL1 to PL7 may include a program voltage application interval (S10) in which the program voltages PGM1 to PGM7 are applied and a verification interval in which whether a memory cell has been programmed is determined by applying the pre-verification voltages PV1, PV2, and PV3 and the verification voltages V1, V2, and V3. In particular, the memory device according to an embodiment of the present disclosure may adjust an increase in the level of a program voltage that is applied to a program word line in the voltage application interval (S10) of a second program loop that is subsequent to a first program loop, based on the number of cells each having a threshold voltage level higher than the levels of the pre-verification voltages PV1, PV2, and PV3, among cells that have been selected as a verification target in the verification interval of the first program loop, among the multiple program loops PL1 to PL7.

Specifically, the memory device may apply the program voltage (S10) in the voltage application interval of the first program loop, among the multiple program loops PL1 to PL7.

After S10, the memory device may check whether the threshold voltage level of each of the cells that have been selected as the verification target is the lowest target level in the verification interval of the first program loop (S20). That is, the memory device may check whether the target level of the cells that have been selected as the verification target is the level of the first verification voltage V1.

When the threshold voltage level of each of the cells that have been selected as the verification target is the lowest target level in the verification interval of the first program loop in S20 (YES in S20), that is, when the target level of the cells that have been selected as the verification target is the level of the first verification voltage V1, the memory device may compare the number of cells each having a threshold voltage level higher than the first pre-verification voltage PV1, among the cells that have been selected as the verification target, with a set number (S30).

When the number of cells each having a threshold voltage level higher than the first pre-verification voltage PV1, among the cells that have been selected as the verification target, is less than the set number in S30 (YES in S30), the memory device may operate so that the level of the program voltage that is applied to the program word line in the voltage application interval (S10) of the second program loop has an increase corresponding to a first level (S50), compared to the level of a program voltage that is applied to the program word line in the voltage application interval (S10) of the first program loop.

When the number of cells each having a threshold voltage level higher than the first pre-verification voltage PV1, among the cells that have been selected as the verification target, is the set number or more in S30 (NO in S30), the memory device may operate so that the level of the program voltage that is applied to the program word line in the voltage application interval (S10) of the second program loop has an increase corresponding to a second level (S40), compared to the level of the program voltage that is applied to the program word line in the voltage application interval (S10) of the first program loop. In this case, the second level may be smaller than the first level.

When the threshold voltage level of each of the cells that have been selected as the verification target in the verification interval of the first program loop is not the lowest target level in S20 (NO in S20), that is, when the target level of the cells that have been selected as the verification target is the level of another verification voltage V2 or V3 not the level of the first verification voltage V1, the memory device might not perform S30, and may perform S40. That is, the memory device may operate so that the level of the program voltage that is applied to the program word line in the voltage application interval (S10) of the second program loop has the increase corresponding to the second level (S40), compared to the level of the program voltage that is applied to the program word line in the voltage application interval (S10) of the first program loop. In this case, the second level may be smaller than the first level.

Referring to FIG. 6 together with FIG. 3, the program operation may include the multiple program loops PL1 to PL7. Furthermore, each of the multiple program loops PL1 to PL7 may include the program voltage application interval (S10) in which the program voltages PGM1 to PGM7 are applied and the verification interval in which whether a memory cell has been programmed is determined by applying the additional verification voltages PPV1, PPV2, and PPV3, the pre-verification voltages PV1, PV2, and PV3, and the verification voltages V1, V2, and V3. In particular, the memory device according to an embodiment of the present disclosure may adjust an increase in the level of the program voltage that is applied to the program word line in the voltage application interval (S10) of the second program loop that is subsequent to the first program loop, based on the number of cells each having a threshold voltage level higher than the level of each of the additional verification voltages PPV1, PPV2, and PPV3, among the cells that have been selected as the verification target, in the verification interval of the first program loop.

Specifically, the memory device may apply the program voltage in the voltage application interval of the first program loop, among the multiple program loops PL1 to PL7, (S10).

After S10, the memory device may check whether the threshold voltage level of each of the cells that have been selected as the verification target is the lowest target level in the verification interval of the first program loop (S20). That is, the memory device may check whether the target level of the cells that have been selected as the verification target is the level of the first verification voltage V1.

When the threshold voltage level of each of the cells that have been selected as the verification target is the lowest target level in the verification interval of the first program loop in S20 (YES in S20), that is, when the target level of the cells that have been selected as the verification target is the level of the first verification voltage V1, the memory device may compare, with the set number, the number of cells each having a threshold voltage level higher than the first additional verification voltage PPV1, among the cells that have been selected as the verification target (S30).

When the number of cells each having a threshold voltage level higher than the first additional verification voltage PPV1, among the cells that have been selected as the verification target, is less than the set number in S30 (YES in S30), the memory device may operate so that the level of the program voltage that is applied to the program word line in the voltage application interval (S10) of the second program loop has the increase corresponding to the first level (S50), compared to the level of the program voltage that is applied to the program word line in the voltage application interval (S10) of the first program loop.

When the number of cells each having a threshold voltage level higher than the first additional verification voltage PPV1, among the cells that have been selected as the verification target, is the set number or more in S30 (NO in S30), the memory device may operate so that the level of the program voltage that is applied to the program word line in the voltage application interval (S10) of the second program loop has the increase corresponding to the second level (S40), compared to the level of the program voltage that is applied to the program word line in the voltage application interval (S10) of the first program loop. In this case, the second level may be smaller than the first level.

When the threshold voltage level of each of the cells that have been selected as the verification target is not the lowest target level in the verification interval of the first program loop in S20 (NO in S20), that is, when the target level of the cells that have been selected as the verification target is the level of another verification voltage V2 or V3 not the level of the first verification voltage V1, the memory device might not perform S30, and may perform S40. That is, the memory device may operate so that the level of the program voltage that is applied to the program word line in the voltage application interval (S10) of the second program loop has the increase corresponding to the second level (S40), compared to the level of the program voltage that is applied to the program word line in the voltage application interval (S10) of the first program loop. In this case, the second level may be smaller than the first level.

Although various embodiments have been described for illustrative purposes, it will be apparent to those skilled in the art that various changes and modifications may be made without departing from the spirit and scope of the present teachings as defined in the following claims.

What is claimed is:

1. A memory device comprising:
   a memory cell array comprising multiple memory cells that are connected between multiple word lines and multiple bit lines; and
   a controller configured to use an increment step pulse program (ISPP) method of repeatedly performing a program loop comprising a voltage application interval and a verification interval until a program operation for cells that have been connected to a word line that have been selected as a program target reach a threshold voltage level, and configured to adjust how much an increase in a level of a program voltage that is applied to the selected word line in the voltage application interval of a second program loop following a first program loop, based on a result of a comparison between a threshold voltage level of each of cells that have been selected as a verification target, among the cells that have been connected to the selected word line, and a pre-target level lower than a target level in the verification interval of the first program loop, among the program loops that are repeated according to the ISPP method.

2. The memory device of claim 1, wherein the controller comprises:
a control circuit unit configured to output a comparison signal corresponding to a result of a comparison between a number of cells each including a threshold voltage level higher than the pre-target level, among the selected cells, and a set number in the verification interval of the first program loop and configured to adjust an increase in a level of a second program voltage that is applied to the selected word line in the voltage application interval of the second program loop, compared to a level of a first program voltage that is applied to the selected word line in the voltage application interval of the first program loop, in response to a level adjustment signal that is input during the voltage application interval of the second program loop; and
a control operation unit configured to generate the level adjustment signal including a value determined based on the comparison signal that has been applied by the control circuit unit in the verification interval of the first program loop and configured to output the level adjustment signal to the control circuit unit during the voltage application interval of the second program loop.

3. The memory device of claim 2, wherein the control operation unit is configured to:
generate the level adjustment signal that controls the second program voltage to have an increase corresponding to a first level, compared to the level of the first program voltage, in response to the comparison signal indicating the number of cells each including the threshold voltage level higher than the pre-target level, among the selected cells, is less than the set number; and
generate the level adjustment signal that controls the second program voltage to have an increase corresponding to a second level, compared to the level of the first program voltage, in response to the comparison signal indicating the number of cells each including the threshold voltage level higher than the pre-target level, among the selected cells, is the set number or more, and
wherein the second level is smaller than the first level.

4. The memory device of claim 3, wherein:
program states of the multiple memory cells are divided based on N threshold voltage levels, and
the control operation unit is configured to generate the level adjustment signal that controls the second program voltage to have the increase corresponding to any one of the first level and the second level, compared to the level of the first program voltage, in response to the comparison signal that has been applied by the control circuit unit, in response to determining a target level of the selected cells corresponds to a lowest threshold voltage level among the N threshold voltage levels.

5. The memory device of claim 4, wherein the control operation unit is configured to generate the level adjustment signal that controls the second program voltage to have the increase corresponding to the second level, compared to the level of the first program voltage, regardless of the comparison signal that has been applied by the control circuit unit, in response to determining the target level of the selected cells corresponds to remaining threshold voltage levels except the lowest threshold voltage level, among the N threshold voltage levels.

6. The memory device of claim 2, wherein:
the pre-target level comprises a first pre-target level lower than the target level and a second pre-target level lower than the first pre-target level, and
the control circuit unit is configured to:
output, to the control operation unit, the comparison signal corresponding to a result of a comparison between the threshold voltage level of each of the selected cells and at least one target level of the first and second pre-target levels during the verification interval of the first program loop, and
adjust the increase in the level of the second program voltage, compared to the level of the first program voltage, in response to the level adjustment signal that is input by the control operation unit during the voltage application interval of the second program loop.

7. The memory device of claim 6, wherein the control operation unit is configured to:
generate the level adjustment signal that controls the second program voltage to have an increase corresponding to the first level, compared to the level of the first program voltage, in response to the comparison signal indicating a number of cells each including a threshold voltage level higher than the second pre-target level, among the selected cells, is less than the set number; and
generate the level adjustment signal that controls the second program voltage to have an increase corresponding to the second level, compared to the level of the first program voltage, in response to the comparison signal indicating the number of cells each including the threshold voltage level higher than the second pre-target level, among the selected cells, is the set number or more, and
wherein the second level is smaller than the first level.

8. The memory device of claim 2, wherein the control circuit unit comprises:
a page buffer unit configured to adjust a potential level of each of selected bit lines that have been connected to the selected cells, based on a result of a comparison between the threshold voltage level of each of the selected cells and the pre-target level in the verification interval of the first program loop, through multiple page buffers that have been connected to the multiple bit lines;
a check unit connected to the page buffer unit, configured to check whether each of the selected cells has a pass or fail (pass/fail) state by checking the potential level of each of the selected bit lines in the verification interval of the first program loop, and configured to generate the comparison signal by comparing, with the set number, a number of cells that have been checked to include the pass state; and
a voltage supply circuit configured to supply the second program voltage to the selected word line by adjusting the level of the second program voltage in response to the level adjustment signal that has been input by the control operation unit in the voltage application interval of the second program loop.

9. An operating method of a memory device, comprising:
repeatedly performing program loops, comprising a voltage application interval and a verification interval, on cells that have been connected to a word line that have been selected as a program target, among multiple memory cells that have been connected between multiple word lines and multiple bit lines according to an increment step pulse program (ISPP) method until a program operation is completed;
applying a first program voltage to the selected word line in the voltage application interval of a first program loop, among the program loops that are repeated according to the ISPP method;
comparing a threshold voltage level of each of cells that have been selected as a verification target, among the cells that have been connected to the selected word line, and a pre-target level lower than a target level in the verification interval of the first program loop after the first application step; and
adjusting how much an increase in a level of a second program voltage that is applied to the selected word line, based on a result of the comparison step, in the voltage application interval of a second program loop, among the program loops that are repeated according to the ISPP method.

10. The operating method of claim 9, wherein the adjusting the increase in the level of the second program voltage comprises:
adjusting the second program voltage to have an increase corresponding to a first level, compared to a level of the first program voltage, in response to determining a number of cells each including a threshold voltage level higher than the pre-target level, among the selected cells, is less than a set number as a result of the comparison step; and
adjusting the second program voltage to have an increase corresponding to a second level, compared to the level of the first program voltage, in response to determining the number of cells each including the threshold voltage level higher than the pre-target level, among the selected cells, is the set number or more as a result of the comparison step,
wherein the second level is smaller than the first level.

11. The operating method of claim 10, wherein:
program states of the multiple memory cells are divided based on N threshold voltage levels, and
the adjusting the increase in the level of the second program voltage comprises controlling the second program voltage to have the increase corresponding to any one of the first level and the second level, compared to the level of the first program voltage, based on a result of the comparison step, in response to determining a target level of the selected cells corresponds to a lowest threshold voltage level among the N threshold voltage levels.

12. The operating method of claim 11, wherein the adjusting the increase in the level of the second program voltage comprises controlling the second program voltage to have the increase corresponding to the second level, compared to the level of the first program voltage, regardless of a result of the comparing of the threshold voltage levels of each of cells that have been selected as the verification target, in response to determining the target level of the selected cells corresponds to remaining threshold voltage levels except the lowest threshold voltage level, among the threshold voltage levels.

13. The operating method of claim 9, wherein:
the pre-target level comprises a first pre-target level lower than the target level and a second pre-target level lower than the first pre-target level, and
the comparing of the threshold voltage levels of each of cells that have been selected as the verification target comprises the threshold voltage level of each of the selected cells and at least one target level of the first and second pre-target levels in the verification interval of the first program loop.

14. The operating method of claim 13, wherein the adjustment step comprises:
adjusting the second program voltage to have an increase corresponding to the first level, compared to the level of the first program voltage, in response to determining a number of cells each including a threshold voltage level higher than the second pre-target level, among the selected cells, is less than the set number as a result of the comparison of the threshold voltage levels of each of cells that have been selected as the verification target; and
adjusting the second program voltage to have an increase corresponding to the second level in response to determining the number of cells each including the threshold voltage level higher than the second pre-target level, among the selected cells, is the set number or more as a result of the comparison of the threshold voltage levels of each of cells that have been selected as the verification target,
wherein the second level is smaller than the first level.

* * * * *